United States Patent
Lee et al.

(10) Patent No.: US 8,817,500 B2
(45) Date of Patent: Aug. 26, 2014

(54) POWER SUPPLY APPARATUSES FOR PREVENTING LATCH-UP OF CHARGE PUMP AND METHODS THEREOF

(75) Inventors: Seung Jung Lee, Hwanseong-si (KR); Hun Lim, Yongin-si (KR); Ho Hak Rho, Yongin-si (KR); Gyu-Sung Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 275 days.

(21) Appl. No.: 13/364,726

(22) Filed: Feb. 2, 2012

(65) Prior Publication Data

US 2012/0212201 A1 Aug. 23, 2012

(30) Foreign Application Priority Data

Feb. 17, 2011 (KR) .................. 10-2011-0014252
Mar. 29, 2011 (KR) .................. 10-2011-0028253

(51) Int. Cl.
*H02M 1/36* (2007.01)
(52) U.S. Cl.
USPC .............................. 363/59; 32/266; 32/908
(58) Field of Classification Search
CPC ............ H02M 2001/007; H02M 2001/0025; H02M 1/36
USPC ................................ 323/266, 908; 363/59–60
See application file for complete search history.

(56) References Cited

U.S. PATENT DOCUMENTS

| 7,262,587 B2 | 8/2007 | Takimoto et al. |
| 2008/0157733 A1* | 7/2008 | Williams ................. 323/266 |
| 2009/0315528 A1 | 12/2009 | Choi et al. |
| 2011/0031951 A1* | 2/2011 | Chen et al. ................. 323/288 |

FOREIGN PATENT DOCUMENTS

| JP | 2005-354845 A | 12/2005 |
| KR | 2005-0012401 A | 2/2005 |
| KR | 2005-0118088 A | 12/2005 |
| KR | 2009-0131985 A | 12/2009 |

* cited by examiner

*Primary Examiner* — Harry Behm
(74) *Attorney, Agent, or Firm* — Harness, Dickey & Pierce, P.L.C.

(57) ABSTRACT

A power supply apparatus and a power supply method are disclosed. The power supply apparatus may include an internal power supply including a first voltage generator configured to generate a first voltage based on a pulse width modulation control signal, a charge pump configured to receive the first voltage and generate a second voltage, and an inrush current controller configured to be connected between the charge pump and the internal power supply and configured to generate the pulse width modulation control signal based on a target signal and a selection reference voltage.

17 Claims, 25 Drawing Sheets

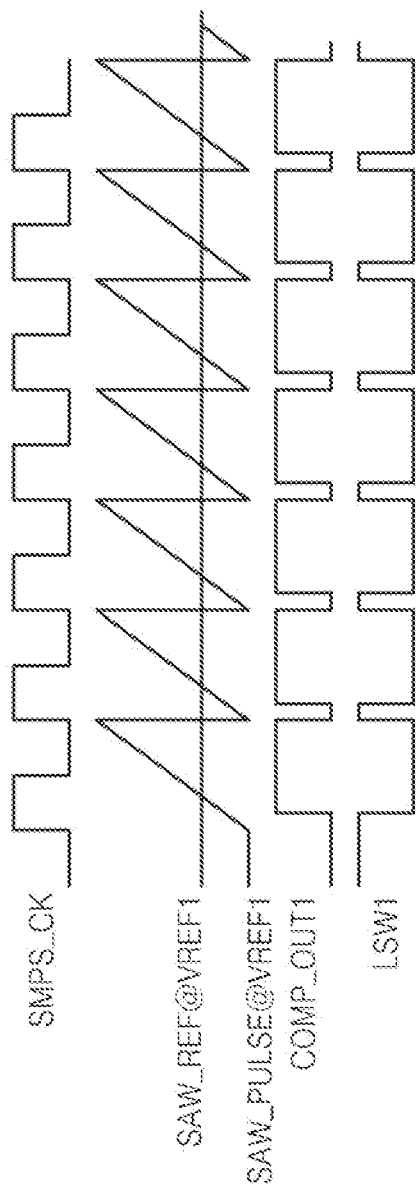

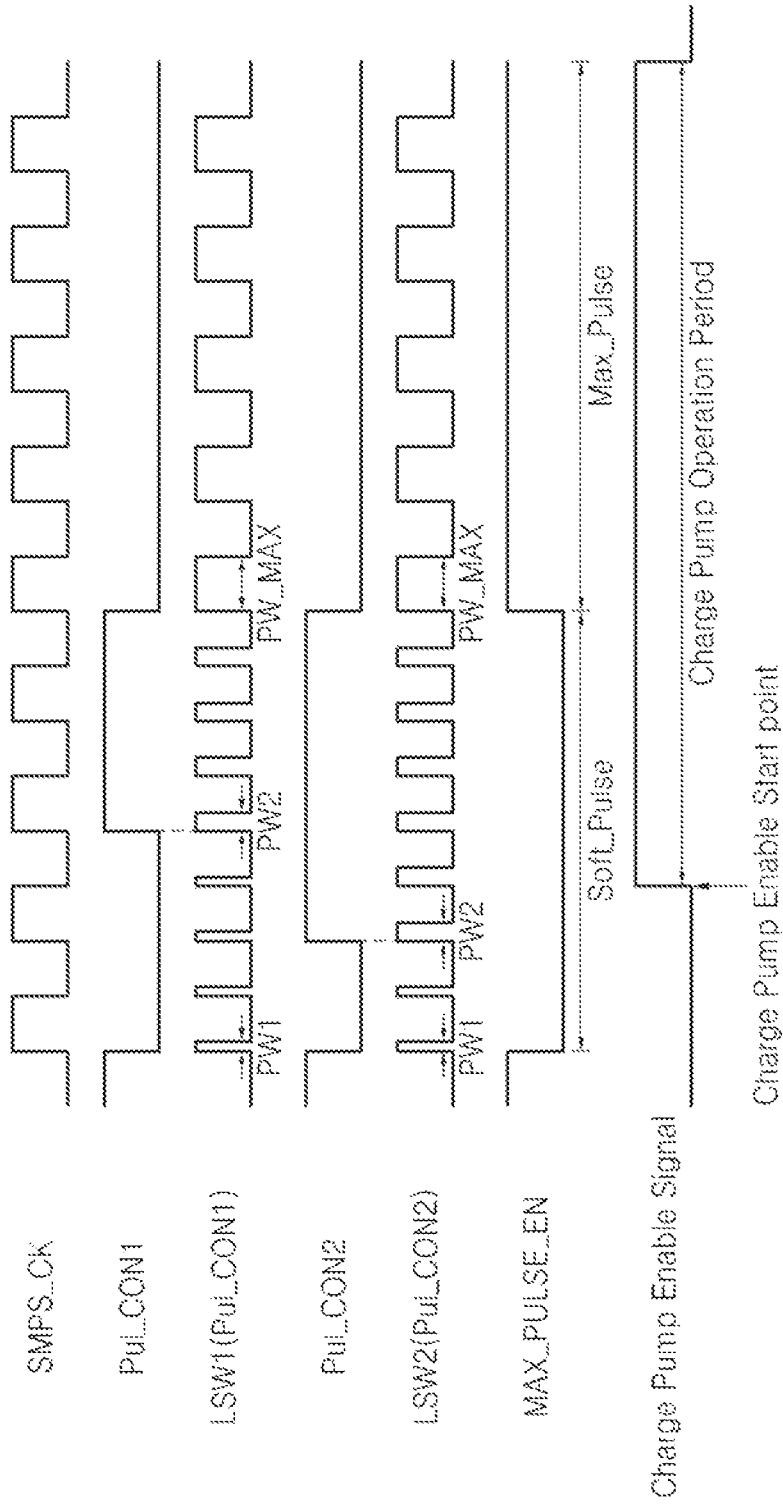

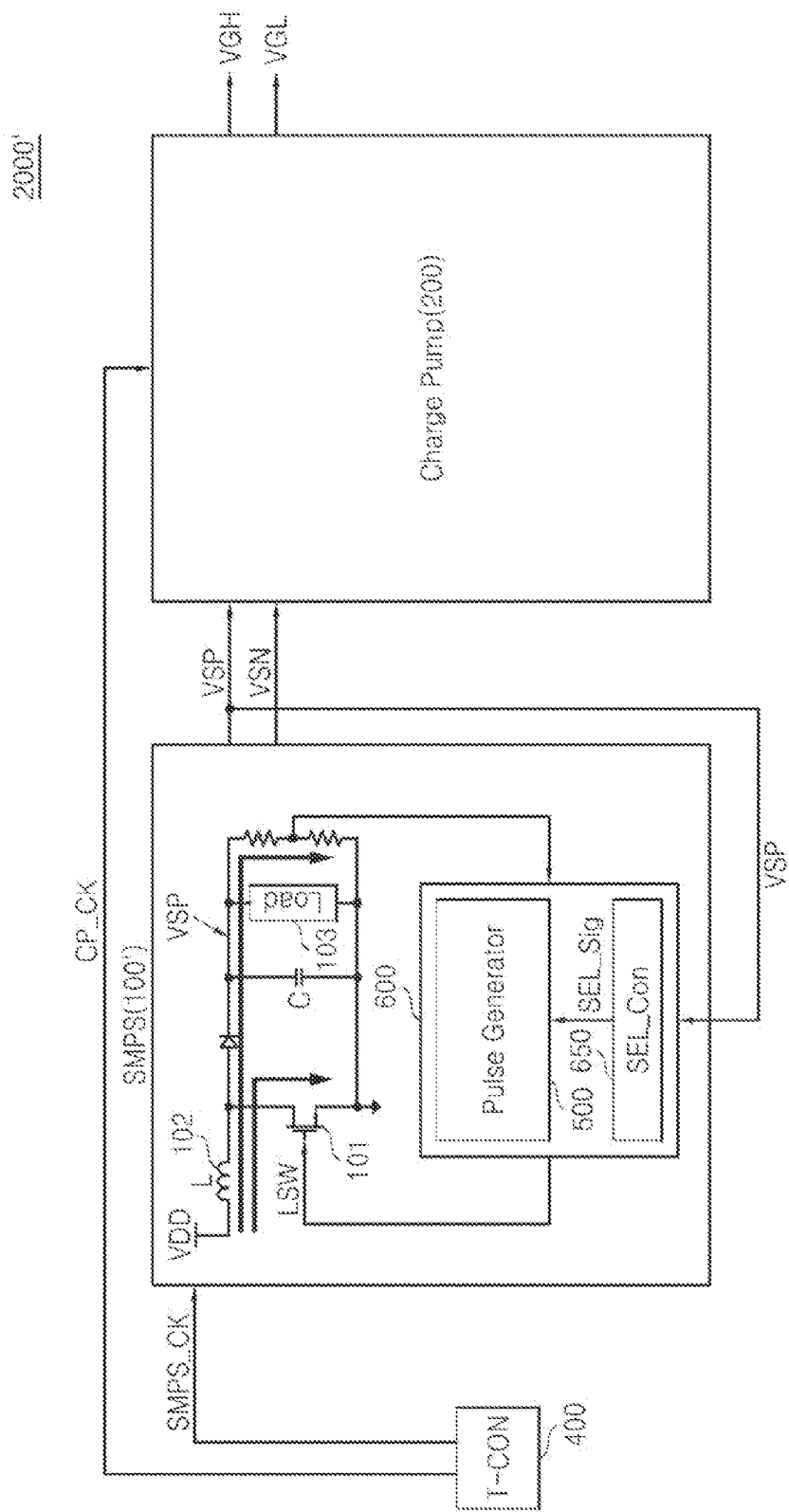

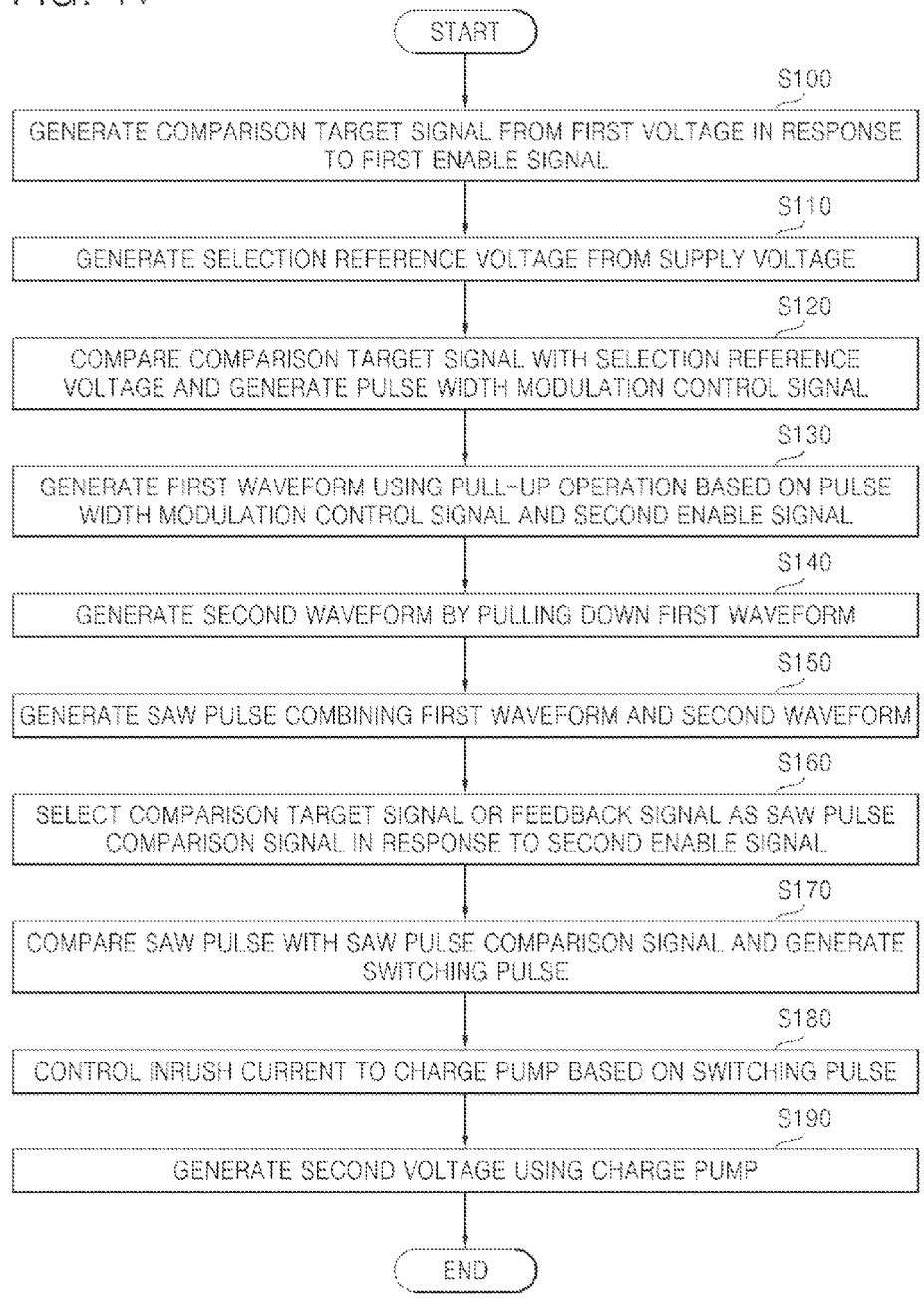

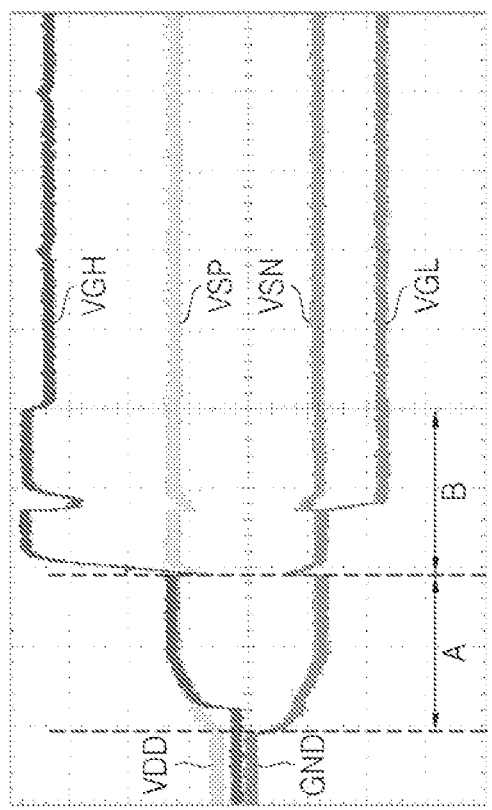

POWER SUPPLY APPARATUSES FOR PREVENTING LATCH-UP OF CHARGE PUMP AND METHODS THEREOF

CROSS-REFERENCE TO RELATED APPLICATIONS

This application claims priority under 35 U.S.C. §119(a) to Korean Patent Application Nos. 10-2011-0014252 filed on Feb. 17, 2011 and 10-2011-0028253 filed on Mar. 29, 2011 the entire contents of each of which are hereby incorporated by reference.

BACKGROUND

Example embodiments relate to a power supply, and more particularly, to power supply apparatuses including a charge pump and methods thereof.

An electric or electronic apparatus generally uses a direct current (DC) power supply which converts alternate current (AC) power into a DC voltage to drive equipment. A switching mode power supply (SMPS) is used as a DC power supply.

DC power supplied from the SMPS is applied to each of the parts of the electronic apparatus. Since the power supplied from the SMPS is 5, 3.3 or 12 V, the electronic apparatus also includes a charge pump which receives a DC voltage from the SMPS and boosts the DC voltage to levels for parts of the electronic apparatus, such as a chipset and memory.

However, the parts may be affected when current is not evenly distributed due to environmental conditions such as an error in design and ambient temperature, e.g., when latch-up occurs due to peak current.

Latch-up is a phenomenon in which current over several hundreds of mA flows in a circuit and disrupts or destructs the circuit. For instance, a parasitic PNPN structure (also referred to as a thyristor structure) is triggered between N-type metal oxide semiconductor (NMOS) and P-type metal oxide semiconductor (PMOS) which are adjacent to each other in a complementary metal oxide semiconductor (CMOS) structure and inrush current may flow in the thyristor structure. When inrush current (or leakage current) flows in an internal device due to an input/output voltage exceeding a rated voltage or when an internal device is in breakdown since a voltage at a power supply terminal exceeds a rated voltage, a large amount of current may affect the device. In order to prevent such latch-up, an external Schottky diode is usually used or an internal Schottky diode may be provided within an integrated circuit.

However, when an external Schottky diode is used, a manufacturing price for modules increases. An internal Schottky diode may increase a chip size.

SUMMARY

According to some example embodiments, there is provided a power supply apparatus including an internal power supply including a first voltage generator configured to generate a first voltage based on a pulse width modulation control signal, a charge pump configured to receive the first voltage and generate a second voltage, and an inrush current controller configured to be connected between the charge pump and the internal power supply and configured to generate the pulse width modulation control signal based on a target signal and a selection reference voltage.

The inrush current controller may include a first sampling circuit configured to divide the first voltage in response to a first enable signal and output the target signal based on the division, a reference voltage generator configured to output the selection reference voltage in response to a reference voltage selection signal, and a first comparator configured to compare the target signal with the selection reference voltage and output the pulse width modulation control signal.

In some example embodiments, the first voltage generator is configured to generate a feedback signal and the internal power supply includes a pulse generator configured to generate a pulse based on the feedback signal. The pulse generator may include a saw pulse generator configured to generate a saw pulse having a slope, the saw pulse based on the pulse width modulation control signal and a second enable signal, a saw pulse comparison signal generator configured to output the target signal or the feedback signal as a saw pulse comparison signal in response to the second enable signal, and a second comparator configured to compare the saw pulse with the saw pulse comparison signal and generate a switching pulse.

The saw pulse generator may include a second generation circuit configured to divide the supply voltage using a plurality of resistors and generate a plurality of secondary reference voltages based on the division, a first waveform generator configured to be connected between the second generation circuit and a saw pulse output terminal, configured to select a voltage among the secondary reference voltages based on the second enable signal, and configured to generate a first waveform by pulling up a ground voltage in response to the voltage selected from among the secondary reference voltages, and a second waveform generator configured to be connected between the second generation circuit and the saw pulse output terminal and to generate a second waveform by pulling down a voltage of the saw pulse output terminal in response to a falling signal, the falling signal generated within the second waveform generator, the falling signal based on sampling the supply voltage according to a clock signal of the internal power supply.

The first waveform generator may include a bias circuit configured to output one of the secondary reference voltages as a soft bias signal in response to the pulse width modulation control signal or output a maximum bias signal as a saw pulse basic signal in response to the second enable signal, a pull-up circuit configured to pull up the voltage of the saw pulse output terminal in response to the saw pulse basic signal, and a storage configured to be connected between the saw pulse output terminal and a ground terminal, the storage configured to store a pulled-up signal and generate the first waveform.

According to other example embodiments, there is provided a power supply method performed by a power supply including an internal power supply and a charge pump. The power supply method includes generating a target signal based on a first voltage generated by the internal power supply in response to a first enable signal, generating a selection reference voltage from a supply voltage, generating a pulse width modulation control signal based on the target signal and the selection reference voltage, controlling a pulse width of a switching pulse based on the pulse width modulation control signal, controlling the amount of inrush current input to the charge pump based on the switching pulse, and generating a second voltage using the charge pump.

At least another example embodiment discloses a power supply including a charge pump configured to receive a first voltage and generate a second voltage based on the first voltage, and an internal power supply configured to generate the first voltage based on a pulse width of a switching pulse, the internal power supply including, a pulse generator configured to generate the switching pulse based on a modulation control signal, the modulation control signal and second voltage being different signals, the modulation control signal based on comparison between a target signal and a selection reference voltage.

BRIEF DESCRIPTION OF THE DRAWINGS

The above and other features and advantages of example embodiments will become more apparent by describing in detail example embodiments thereof with reference to the attached drawings in which:

FIGS. 14A through 14C are signal timing charts showing the operation of a power supply according to other example embodiments;

FIG. 15 is a signal timing chart showing the operation of a power supply according to further example embodiments;

FIG. 16 is a block diagram of a power supply according to yet other example embodiments;

FIG. 17 is a flowchart of a power supply method according to other example embodiments;

FIGS. 18A and 18B are a diagram showing the waveforms in a power supply and a timing chart of input signals in the power supply, according to some example embodiments;

DETAILED DESCRIPTION OF EXAMPLE EMBODIMENTS

Figure 1:
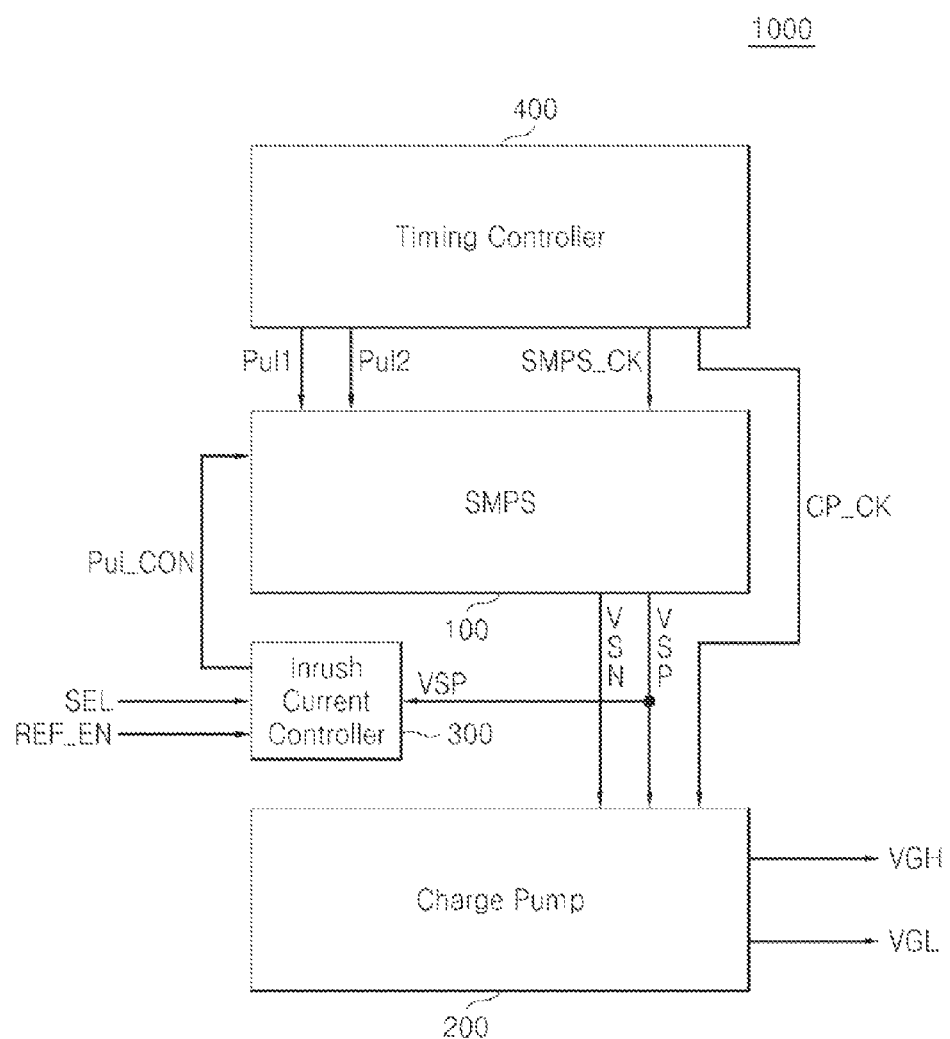
FIG. 1 is a block diagram of a power supply according to some example embodiments.

Example embodiments now will be described more fully hereinafter with reference to the accompanying drawings, in which example embodiments are shown. Example embodiments may, however, be embodied in many different forms and should not be construed as limited to the example embodiments set forth herein. Rather, example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a power supply 1000 according to some example embodiments.

The power supply 1000 includes an internal power supply 100, a charge pump 200, an inrush current controller 300, and a timing controller 400.

The internal power supply 100 performs a switching operation in response to a clock signal SMPS_CK and pulses Pul1 and Pul2 applied by the timing controller 400, thereby controlling the flow of inrush current according to the width of the pulses Pul1 and Pul2. The internal power supply 100 receives a supply voltage VDD as an input and generates a first voltage. The first voltage includes a positive voltage and a negative voltage. For clarity of the description, a first positive voltage is denoted as VSP and a first negative voltage is denoted as VSN. The internal power supply 100 may be a switching mode power supply (SMPS) in some example embodiments, but may be implemented using pulse width modulation in other example embodiments.

The charge pump 200 alternately performs charge and discharge in response to a clock signal CP_CK applied by the timing controller 400, thereby boosting the first voltage and generating a second voltage. The second voltage includes a positive voltage and a negative voltage. For clarity of the description, a second positive voltage is denoted as VGH and a second negative voltage is denoted as VGL. The charge pump 200 may be implemented in various ways in different embodiments.

The inrush current controller 300 receives the first positive voltage VSP from the internal power supply 100, compares it with a selection reference voltage VREF_SEL, and outputs a pulse width modulation control signal Pul_CON to the internal power supply 100.

The timing controller 400 applies a plurality of the predetermined pulses Pul1 and Pul2 with different widths to the internal power supply 100. The internal power supply 100 uses either of the pulses Pul1 and Pul2 as a switching pulse LSW in response to the pulse width modulation control signal Pul_CON to control the amount of inrush current input to the charge pump 200.

Figure 2:
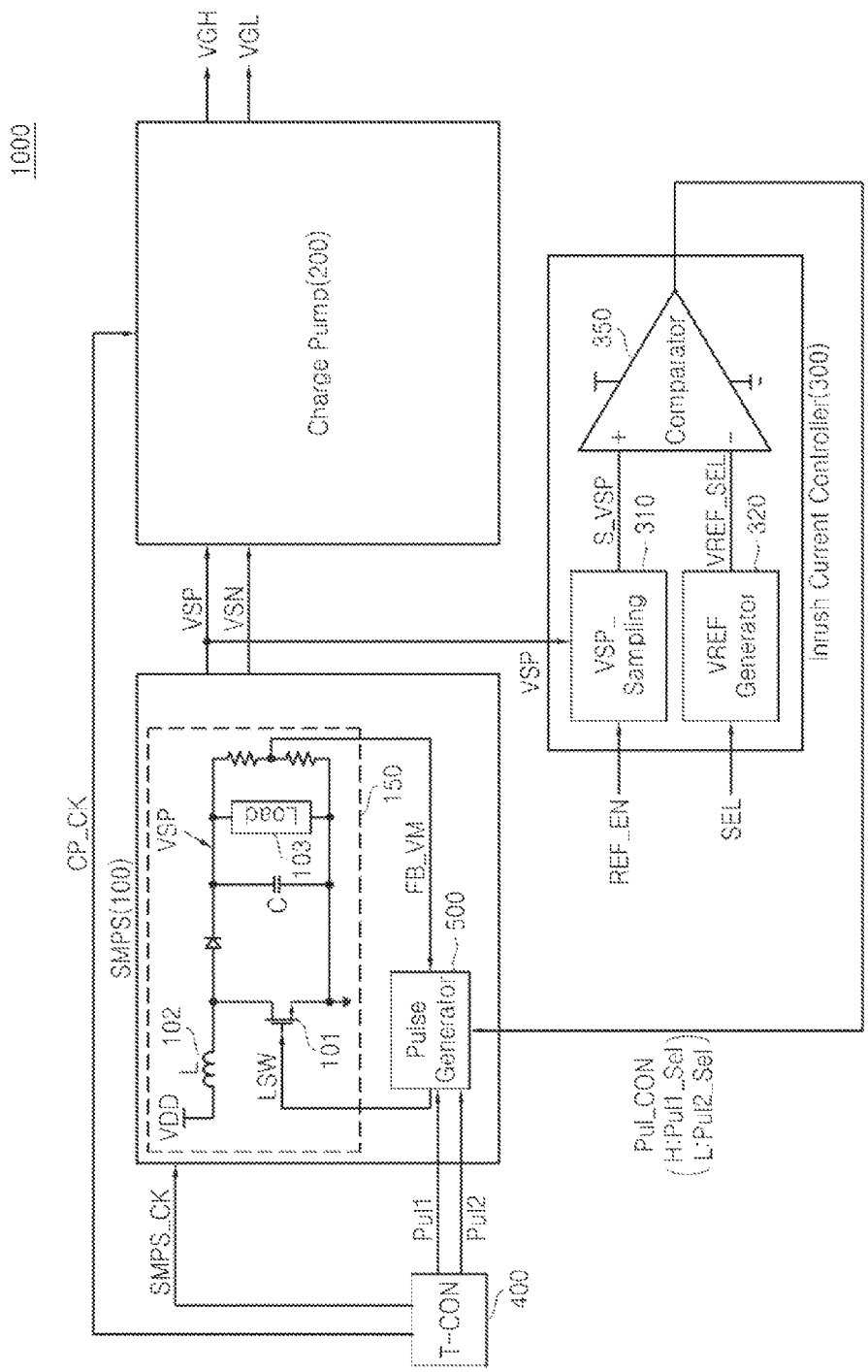
FIG. 2 is a detailed block diagram of the power supply illustrated in FIG. 1 according to an example embodiment.

FIG. 2 is a detailed block diagram of the power supply 1000 illustrated in FIG. 1 according to an example embodiment.

Referring to FIG. 2, the internal power supply 100 includes a first voltage generator 150 and a pulse generator 500. The first voltage generator 150 includes a first switch 101, an inductor 102, and a load circuit 103.

The operation of the internal power supply 100 will be described. The switching pulse LSW generated by the pulse generator 500 is applied to a control terminal of the first switch 101. When the first switch 101 is turned on, energy from the supply voltage VDD is accumulated at the inductor 102. When the first switch 101 is turned off, the energy accumulated at the inductor 102 is discharged to the load circuit 103. When this operation is repeated at a predetermined interval, the first voltage (VSP and VSN) is generated. The first voltage generator 150 divides the first voltage (VSP and VSN) and generates a feedback signal FB_VM. The feedback signal FB_VM is applied to the pulse generator 500 and is reflected when the switching pulse LSW is generated.

The inrush current controller 300 includes a first sampling block 310, a reference voltage generator 320, and a first comparator 350. When a first enable signal REF_EN is not applied to the inrush current controller 300, the pulse generator 500 applies the switching pulse LSW to the first voltage generator 150 based on the feedback signal FB_VM received from the first voltage generator 150. However, when the first enable signal REF_EN is applied to the inrush current controller 300, the inrush current controller 300 generates the pulse width modulation control signal Pul_CON. The pulse generator 500 selects either of the first and second pulses Pul1 and Pul2 having different pulse widths in response to the pulse width modulation control signal Pul_CON and generates the switching pulse LSW by performing pulse width modulation on the selected pulse Pul1 or Pul2. The switching pulse LSW controls the amount of inrush current supplied to the charge pump 200.

The charge pump 200 boosts the first voltage (VSP and VSN) controlled by a controlled pulse in the internal power supply 100 and outputs the second voltage (VGH and VGL). The charge pump 200 is enabled before the first voltage reaches a predetermined maximum output due to the switching pulse and generates the second voltage. The structure and the operation of the inrush current controller 300 will be described in detail with reference to FIG. 3 below.

Figure 3:
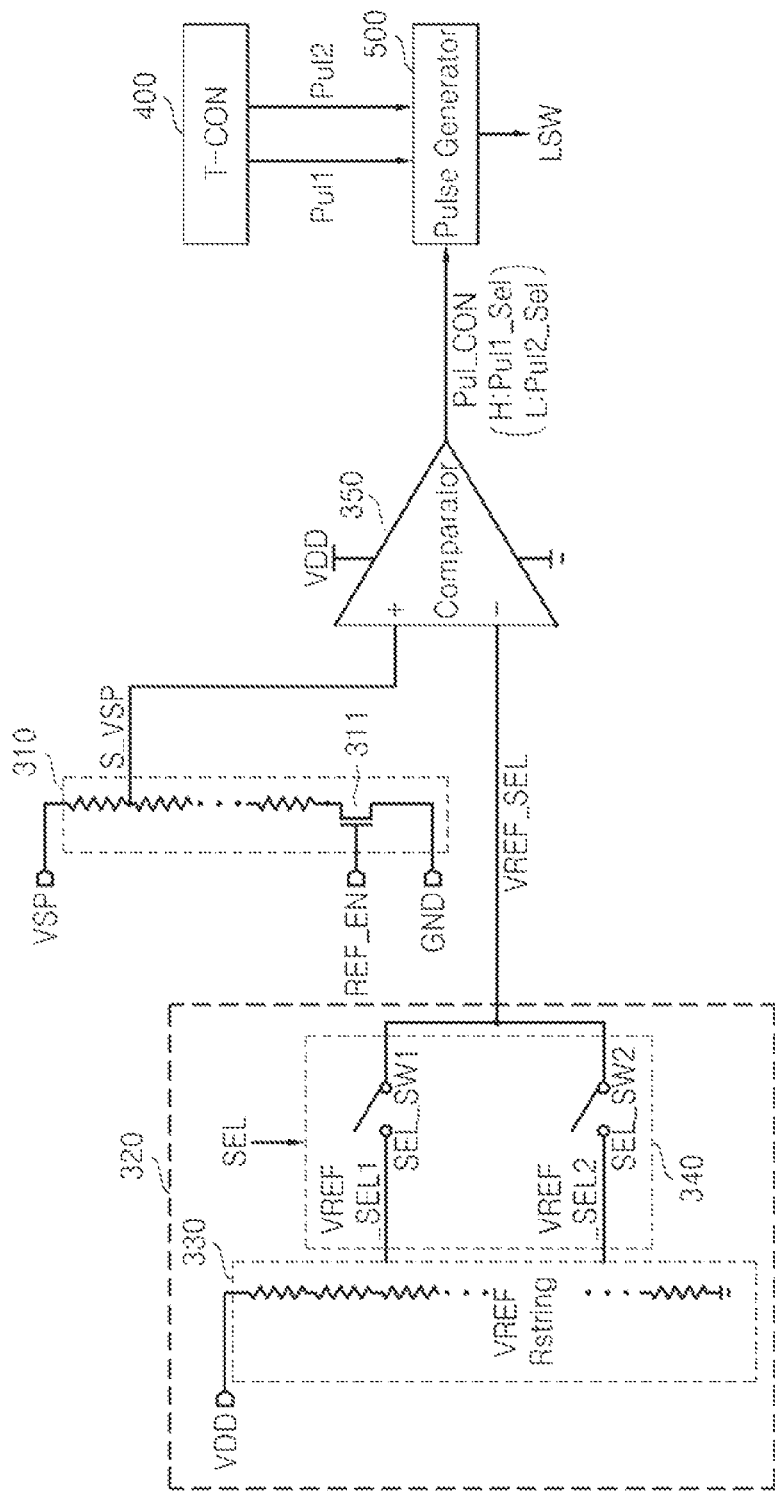
FIG. 3 shows in detail an inrush current controller illustrated in FIG. 2.

FIG. 3 shows in detail the inrush current controller 300 illustrated in FIG. 2.

Referring to FIG. 3, the inrush current controller 300 includes the first sampling block 310, the reference voltage generator 320, and the first comparator 350.

The first sampling block 310 divides the first voltage using a plurality of resistors connected between the first voltage and a ground terminal in response to the first enable signal REF_EN and outputs a comparison target signal S_VSP. The first sampling block 310 is connected between a first voltage output terminal VSP or VSN and a ground terminal GND. The first sampling block 310 includes a second switch 311 and a plurality of resistors. When the first enable signal REF_EN is applied to a control terminal of the second switch 311, the first sampling block 310 divides the first voltage, which is output from the internal power supply 100 and is input to the charge pump 200, using the resistors and outputs the comparison target signal S_VSP.

Example embodiments are not restricted to FIG. 3. For instance, the first voltage VSP is may be used as a comparison target signal as it is or may be divided based on the level of the selection reference voltage VREF_SEL in other embodiments.

The reference voltage generator 320 outputs the selection reference voltage VREF_SEL in response to a reference voltage selection signal SEL. The reference voltage generator 320 generates a plurality of primary reference voltages VREF_SEL_n in order to detect the first voltage and includes a first generation block 330 and a selection block 340.

The first generation block 330 generates the plurality of primary reference voltages VREF_SEL_n by dividing the supply voltage using a plurality of resistors connected between the supply voltage terminal VDD and the ground terminal GND. For instance, when two target reference values are used, the first generation block 330 generates a first primary reference voltage VREF_SEL1 having a first target reference value and a second primary reference voltage VREF_SEL2 having a second target reference values. At this time, two or more target reference values may be used.

The selection block 340 outputs one of the plurality of primary reference voltages VREF_SEL_n as the selection reference voltage VREF_SEL in response to the reference voltage selection signal SEL. The selection block 340 includes a plurality of switches SEL_SW1 and SEL_SW2 respectively connected with reference voltage output terminals. When the first generation block 330 generates at least two primary reference voltages VREF_SEL_n, the selection block 340 selectively outputs one selection reference voltage VREF_SEL in response to the reference voltage selection signal SEL. In FIG. 3, either the first primary reference voltage VREF_SEL1 or the second primary reference voltage VREF_SEL2 is selected and output as the selection reference voltage VREF_SEL in response to the reference voltage selection signal SEL. The switches SEL_SW1 and SEL_SW2 may be implemented in various ways.

The first comparator 350 compares the comparison target signal S_VSP from the first sampling block 310 with the selection reference voltage VREF_SEL. When the comparison target signal S_VSP is lower than the selection reference voltage VREF_SEL, the first comparator 350 outputs the pulse width modulation control signal Pul_CON at a first logic level, for instance a low level. When the comparison target signal S_VSP is higher than the selection reference voltage VREF_SEL, the first comparator 350 outputs the pulse width modulation control signal Pul_CON at a second logic level, for instance a high level.

Figure 4:
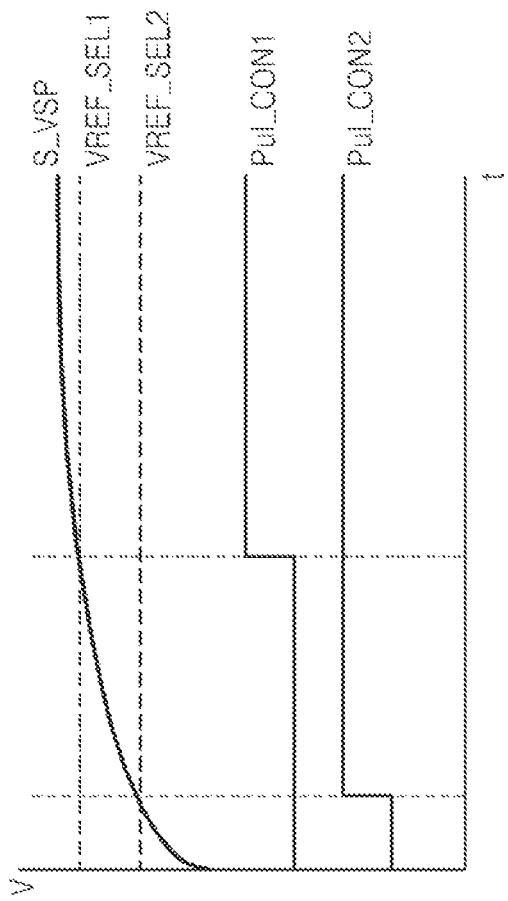
FIG. 4 is a graph of voltage versus time, which illustrates the operation of the inrush current controller illustrated in FIG. 2.

FIG. 4 is a graph of voltage versus time, which illustrates the operation of the inrush current controller 300 illustrated in FIG. 2.

Referring to FIG. 4, the first comparator 350 outputs the pulse width modulation control signal Pul_CON at the first logic level when the comparison target signal S_VSP is lower than the selection reference voltage VREF_SEL. The first comparator 350 outputs the pulse width modulation control signal Pul_CON at the second logic level when the comparison target signal S_VSP is higher than the selection reference voltage VREF_SEL.

For instance, when the first primary reference voltage VREF_SEL1 is input as the selection reference voltage VREF_SEL to the first comparator 350, the first comparator 350 outputs a first pulse width modulation control signal Pul_CON1. When the second primary reference voltage VREF_SEL2 is input as the selection reference voltage VREF_SEL to the first comparator 350, the first comparator 350 outputs a second pulse width modulation control signal Pul_CON2. The pulse width modulation control signal Pul_CON1 or Pul_CON2 is applied to the pulse generator 500 in the internal power supply 100. The pulse width modulation control signal Pul_CON is determined by the reference voltage selection signal SEL.

The pulse generator 500 applies the first pulse Pul1 to the switch 101 when the pulse width modulation control signal Pul_CON is at the high level and applies the second pulse Pul2 having a different width than the first pulse Pul1 to the switch 101 when pulse width modulation control signal Pul_CON is at the low level.

As a result, the first voltage (VSP and VSN) of the internal power supply 100 is gradually generated during a soft pulse period of the first or second pulse Pul1 or Pul2 and a clock signal CP_Sig is applied to the charge pump 200 before the soft pulse period ends in order to prevent peak current. When the charge pump 200 is enabled in response to the clock signal CP_Sig, inrush current gradually flows into the charge pump 200 and is normally converted into a voltage since latch-up is prevented and the second voltage (VGH and VGL) is generated. At this time, the soft pulse period indicates a period in which a pulse has a width less than a predetermined maximum width. In other words, when the internal power supply 100 generates the first voltage (VSP and VSN) and the charge pump 200 generates the second voltage (VGH and VGL), the soft pulse period is from when the first voltage starts to be generated until the second voltage is stabilized. The operation of controlling inrush current based on a pulse width modulation control will be described in detail with reference to FIG. 5.

Figure 5:
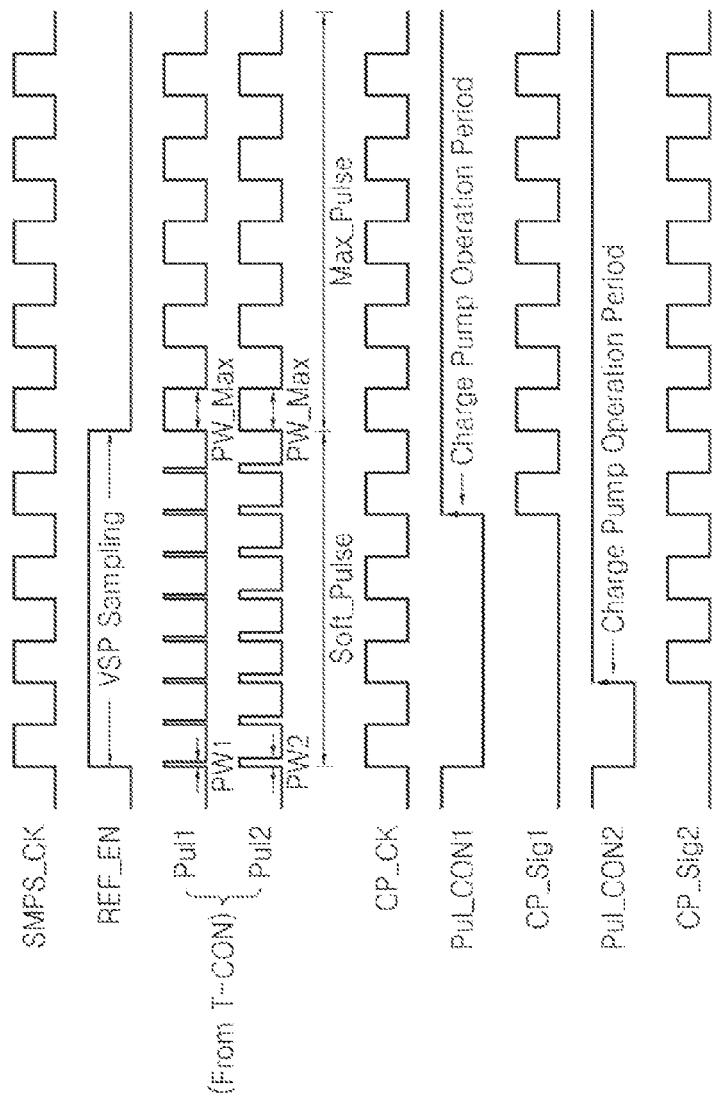
FIG. 5 is a signal timing chart showing the operation of a power supply according to some example embodiments.

FIG. 5 is a signal timing chart showing the operation of the power supply 1000 according to some example embodiments.

Referring to FIG. 5, the internal power supply 100 and the charge pump 200 receive the clock signals SMPS_CK and CP_CK having different frequencies, respectively, from the timing controller 400.

When the enable signal REF_EN is applied to the inrush current controller 300, the inrush current controller 300 divides and samples the first voltage VSP output from the internal power supply 100. The inrush current controller 300 compares the selection reference voltage VREF_SEL with the comparison target signal S_VSP. The timing controller 400 generates the first and second pulses Pul1 and Pul2 respectively having predetermined different pulse widths. For instance, the first pulse Pul1 may have a soft pulse width of PW1 and a maximum pulse width of PW_Max and the second pulse Pul2 may have a soft pulse width of PW2 and the maximum pulse width of PW_Max.

When the timing controller 400 applies the first and second pluses Pul1 and Pul2 to the internal power supply 100, the pulse generator 500 selects either the first pulse Pul1 or the second pulse Pul2 based on the pulse width modulation control signal Pul_CON and applies the selected pulse Pul1 or Pul2 to the control terminal of the first switch 101. A switching operation in the internal power supply 100 is controlled by the pulse width modulation control signal Pul_CON, so that the charge pump 200 is enabled while the internal power supply 100 generates the first voltage (VSP and VSN) during the soft pulse period and the charge pump 200 operates during a charge pump operation period. In other words, before a pulse (i.e., LSW) having the maximum pulse width of PW_Max is applied to the first switch 101 in the internal power supply 100, the charge pump 200 is started to operate and the amount of inrush current is gradually increased, and therefore, a large amount of current is prevented from momentarily rushing into the charge pump 200. As a result, latch-up is prevented.

When there are two reference voltages VREF_SEL1 and VREF_SEL2, two pulse width modulation control signals Pul_CON1 and Pul_CON2 may be generated based on the two reference voltages VREF_SEL1 and VREF_SEL2, respectively. At this time, two enable signals CP_Sig1 and CP_Sig2 may be used as the enable signal CP_Sig for the operation of the charge pump 200. The pulse width, the number of reference voltages, and the levels of the reference voltages are not restricted to FIG. 5 and may be changed in various ways in other embodiments.

Figure 6:
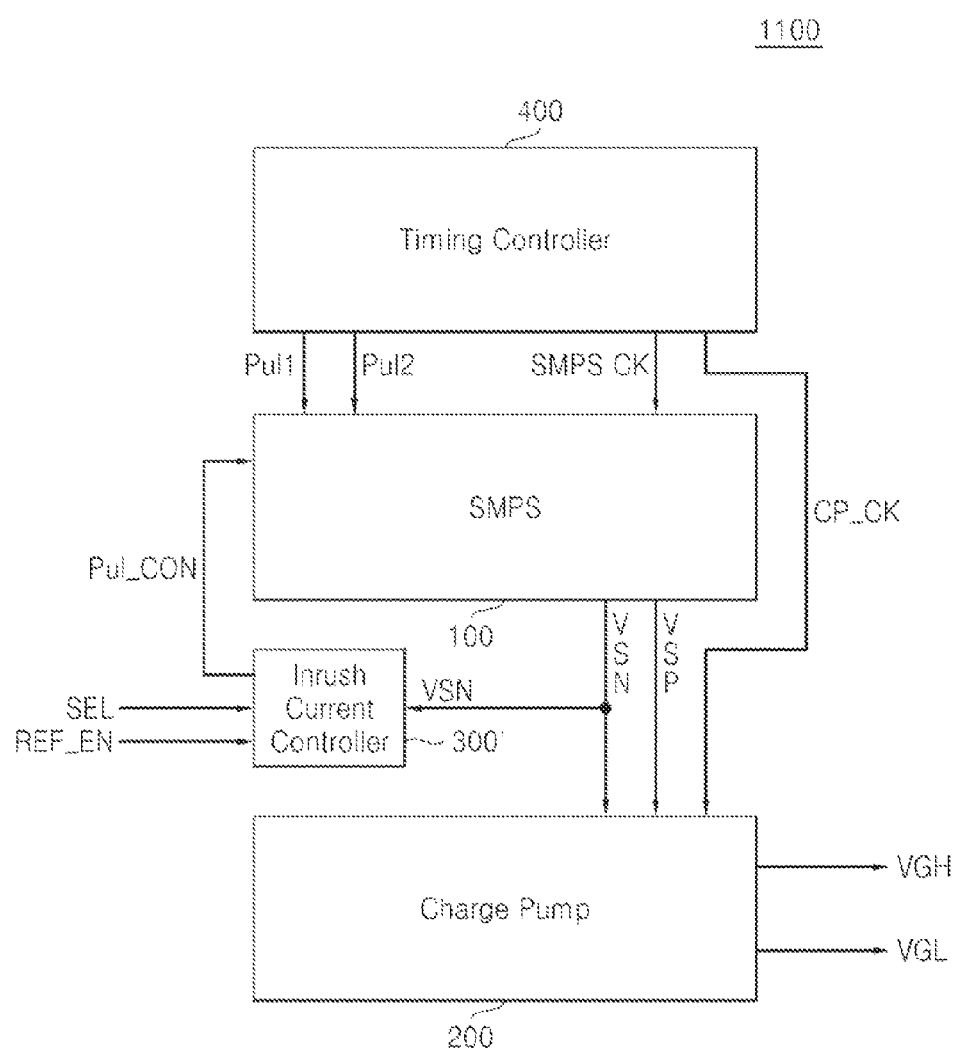
FIG. 6 is a block diagram of a power supply according to other example embodiments.

FIG. 6 is a block diagram of a power supply 1100 according to other example embodiments.

Referring to FIG. 6, the power supply 1100 includes the internal power supply 100, the charge pump 200, an inrush current controller 300', and the timing controller 400. The description of the power supply 1100 will focus on the differences from the power supply 1000 illustrated in FIGS. 2 and 3.

Unlike the inrush current controller 300 illustrated in FIG. 2, the inrush current controller 300' may use the negative voltage VSN in the first voltage as an input signal. In other words, when the enable signal REF_EN is applied to the inrush current controller 300', the inrush current controller 300' performs sampling using the first negative voltage VSN generated by the internal power supply 100 as the input signal to generate a comparison target signal S_VSN, compares the comparison target signal S_VSN with the selection reference voltage VREF_SEL, and sends a comparison result to the pulse generator 500 of the internal power supply 100, so that the amount of inrush current to the charge pump 200 is controlled. At this time, the inrush current controller 300' operates according to the same principle as the inrush current controller 300 illustrated in FIG. 3.

Figure 7:
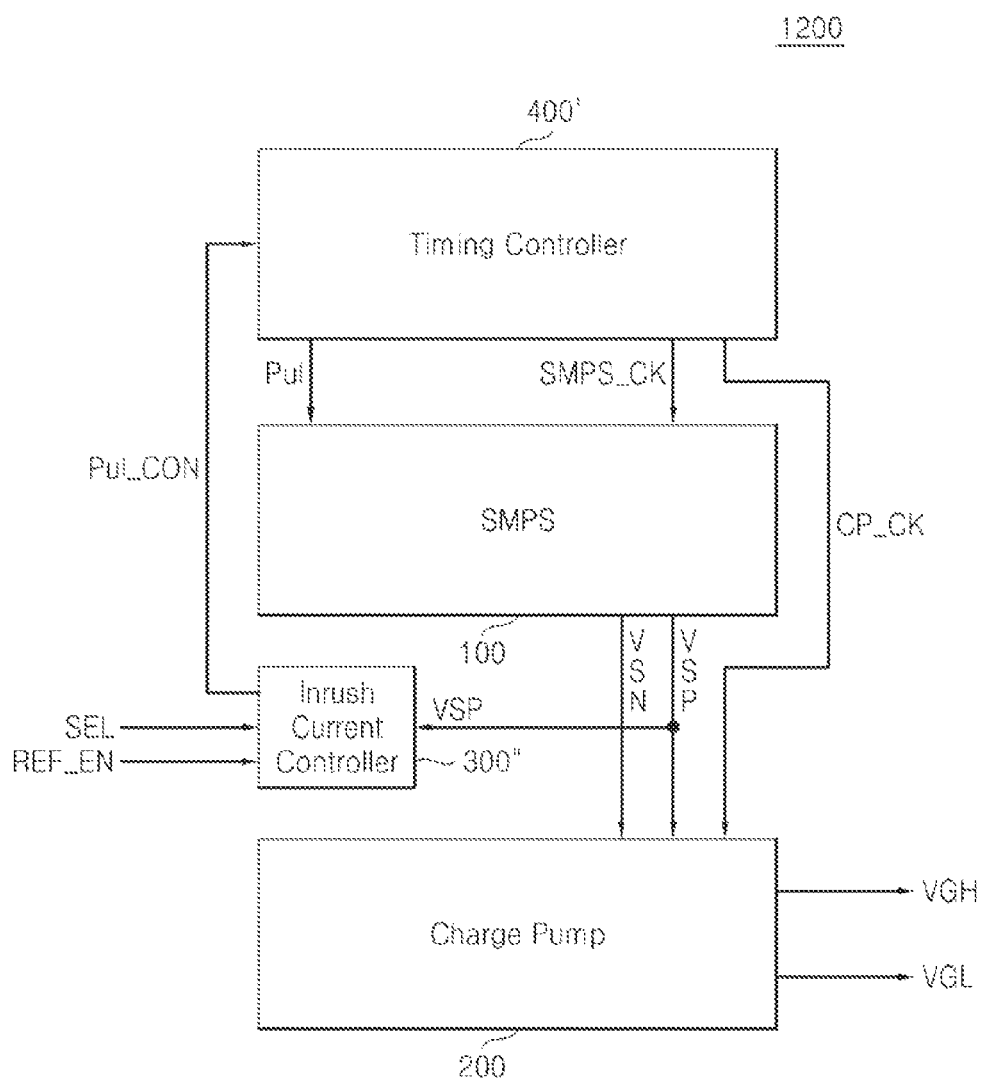
FIG. 7 is a block diagram of a power supply according to further example embodiments.

FIG. 7 is a block diagram of a power supply 1200 according to further example embodiments.

Referring to FIG. 7, the power supply 1200 includes the internal power supply 100, the charge pump 200, an inrush current controller 300", and a timing controller 400'. The description of the power supply 1200 will focus on the differences from the power supply 1000 illustrated in FIGS. 2 and 3.

The inrush current controller 300" compares the comparison target signal S_VSP with the selection reference voltage VREF_SEL and generates the pulse width modulation control signal Pul_CON. The inrush current controller 300" operates according to the same principle as the inrush current controller 300 illustrated in FIG. 3, with the exception that the pulse width modulation control signal Pul_CON is not applied to the pulse generator 500 as in the example embodiments illustrated in FIGS. 1 through 3 but is applied to the timing controller 400'.

The timing controller 400' stores information about at least two predetermined pulse widths and applies a pulse Pul with a pulse width corresponding to the pulse width modulation control signal Pul_CON to the internal power supply 100.

As a result, the pulse Pul is input to the pulse generator 500 and output as the switch pulse LSW in the internal power supply 100, so that the first voltage (VSP and VSN) is gradually formed. The clock signal or charge pump enable signal CP_Sig is applied to the charge pump 200 before the end of the soft pulse period of the switching pulse LSW. Thereafter, inrush current is gradually input to the charge pump 200 preventing latch-up, so that the charge pump 200 performs its normal boost-up operation to generate the second voltage.

Figure 8:
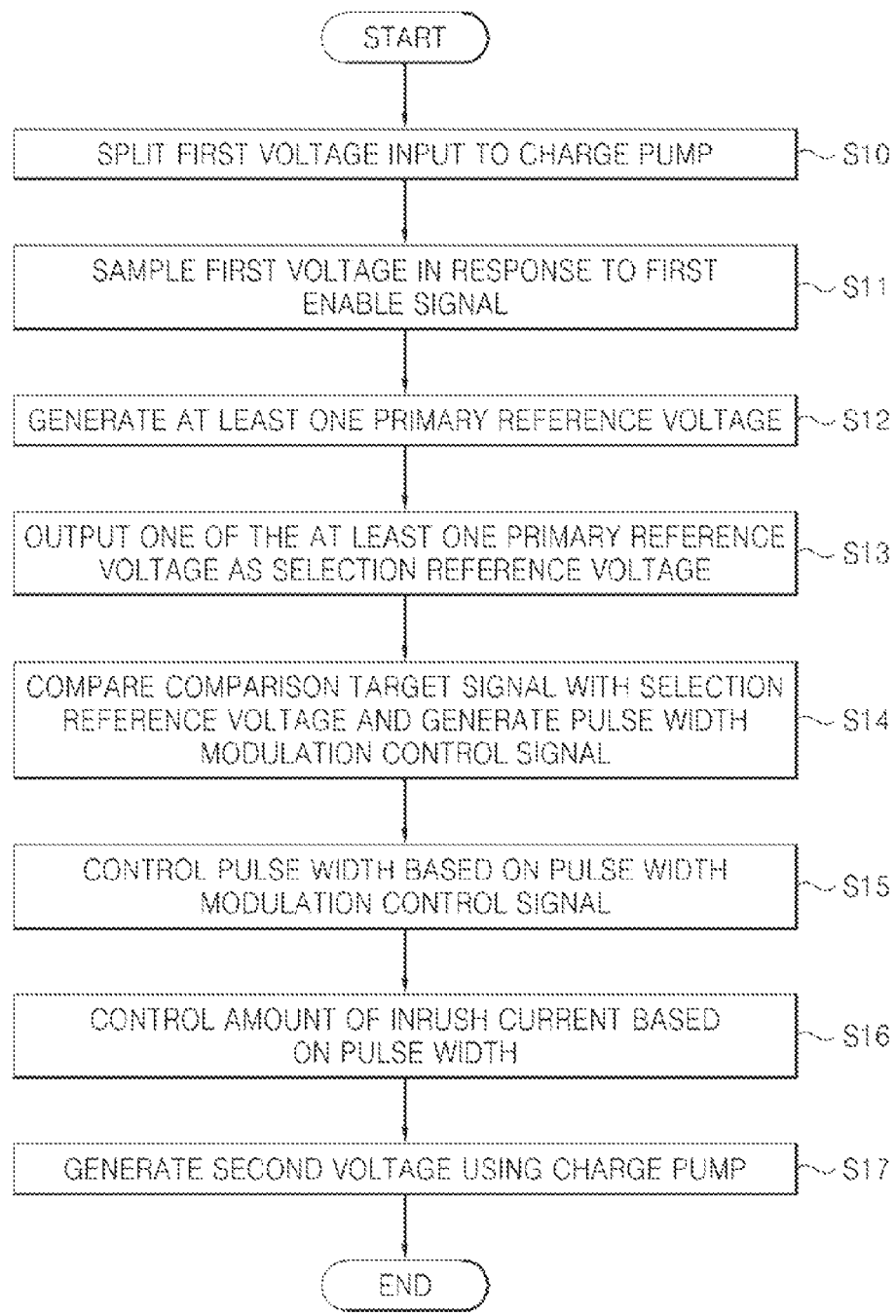
FIG. 8 is a flowchart of a power supply method according to some example embodiments.

FIG. 8 is a flowchart of a power supply method according to some example embodiments. Referring to FIG. 8, when the supply voltage VDD is applied to the internal power supply 100 using pulse width modulation, the internal power supply 100 boosts the supply voltage VDD and generates the first voltage VSP. The first voltage VSP is boosted up by the charge pump 200 and generated as the second voltage VGH. At this time, negative voltages GND, VSN, and VGL are secondarily generated. The internal power supply 100 using the pulse width modulation may be an SMPS but may be implemented in various ways. The charge pump 200 may also be implemented in various ways.

When the first voltage is generated by the internal power supply 100 using the pulse width modulation and input to the charge pump 200, the first voltage is split in operation S10. The first voltage is sampled in response to the first enable signal REF_EN in operation S11. At this time, the first voltage may be sampled as it is or may be generated by division in response to the selection reference voltage VREF_SEL and then sampled, but example embodiments are not restricted thereto. The first voltage may be the first positive voltage VSP or the first negative voltage VSN.

At least one primary reference voltage VREF_SEL_n is generated from the supply voltage VDD in operation S12. One of the at least one primary reference voltage VREF_SEL_n is output as the selection reference voltage VREF_SEL in response to the reference voltage selection signal SEL in operation S13.

The comparison target signal S_VSP or S_VSN obtained as a result of the sampling is compared with the selection reference voltage VREF_SEL and the pulse width modulation control signal Pul_CON is output in operation S14. At this time, when the comparison target signal S_VSP or S_VSN is lower than the selection reference voltage VREF_SEL, the pulse width modulation control signal Pul_CON is output at the low level. When the comparison target signal S_VSP or S_VSN is higher than the selection reference voltage VREF_SEL, the pulse width modulation control signal Pul_CON is output at the high level.

The internal power supply 100 controls a pulse width in response to the pulse width modulation control signal Pul_CON in operation S15. At this time, the first pulse Pul1 generated by the timing controller 400 may be selected when the pulse width modulation control signal Pul_CON is at the low level. The second pulse Pul2 generated by the timing controller 400 may be selected when the pulse width modulation control signal Pul_CON is at the high level.

Alternatively, the timing controller 400' may select the predetermined first pulse Pul1 and apply it to the internal power supply 100 when the pulse width modulation control signal Pul_CON is at the low level. The timing controller 400' may select the predetermined second pulse Pul2 and apply it to the internal power supply 100 when the pulse width modulation control signal Pul_CON is at the high level.

The amount of inrush current to the charge pump 200 is controlled based on the switching pulse LSW obtained as a result of controlling the pulse width in operation S16. The charge pump enable signal CP_Sig is applied to the charge pump 200 before the end of a soft pulse period and the second voltage (VGH and VGL) is generated in operation S17 without latch-up due to peak current since the inrush current gradually increases.

Figure 9:
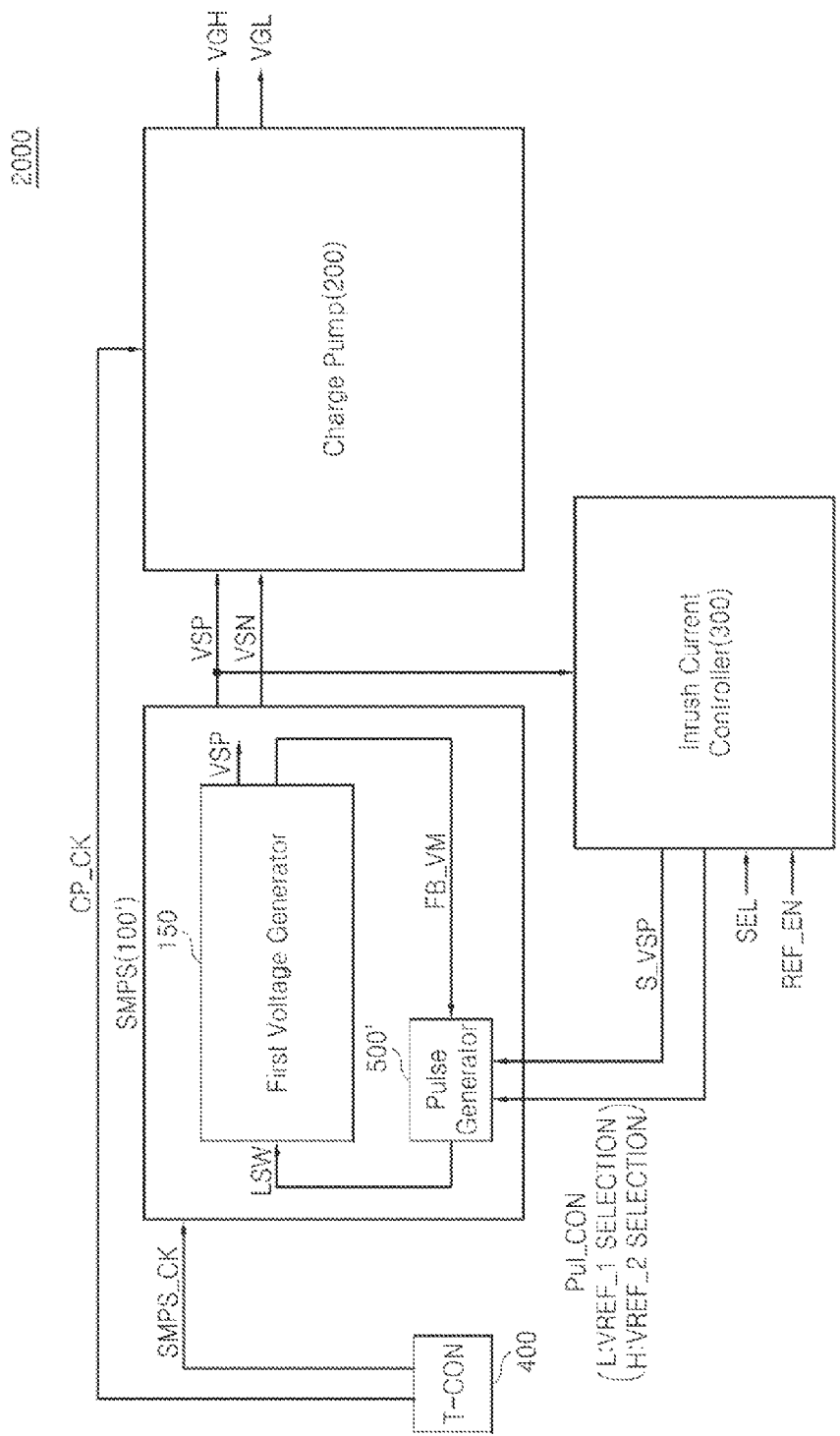
FIG. 9 is a block diagram of a power supply according to other example embodiments.

FIG. 9 is a block diagram of a power supply 2000 according to other example embodiments. Referring to FIG. 9, the power supply 2000 includes the internal power supply 100, the charge pump 200, the inrush current controller 300, and the timing controller 400. The description of the power supply 2000 will focus on the differences from the power supply 1000 illustrated in FIGS. 2 and 3.

The internal power supply 100 performs a switching operation in response to the clock signal SMPS_CK applied by the timing controller 400 and controls the flow of inrush current using a pulse width. The internal power supply 100' includes the first voltage generator 150 and the pulse generator 500'.

The first voltage generator 150 receives the supply voltage VDD and generates the first voltage (VSP and VSN) and the feedback signal FB_VM. The first voltage includes the first positive voltage VSP and the first negative voltage VSN. The pulse generator 500' receives the feedback signal FB_VM and the internal power supply clock signal SMPS_CK, generates the switching pulse LSW, and applies the switching pulse LSW to the first voltage generator 150.

The inrush current controller 300 receives the first voltage (VSP), which is output from the internal power supply 100' and input to the charge pump 200, and the first enable signal REF_EN, compares the first voltage (VSP) with the selection reference voltage VREF_SEL, and outputs the pulse width modulation control signal Pul_CON and the comparison target signal S_VSP to the internal power supply 100'. At this time, the pulse width modulation control signal Pul_CON is used to select a soft bias signal related with the slope of a square wave and is applied to the pulse generator 500' to control a pulse width.

The charge pump 200 boosts the first voltage (VSP and VSN) that has been controlled based on the controlled pulse in the internal power supply 100' and outputs the second voltage (VGH and VGL). At this time, due to the switching pulse LSW the charge pump 200 is enabled and generates the second voltage before the first voltage reaches a predetermined maximum output.

Figure 10:
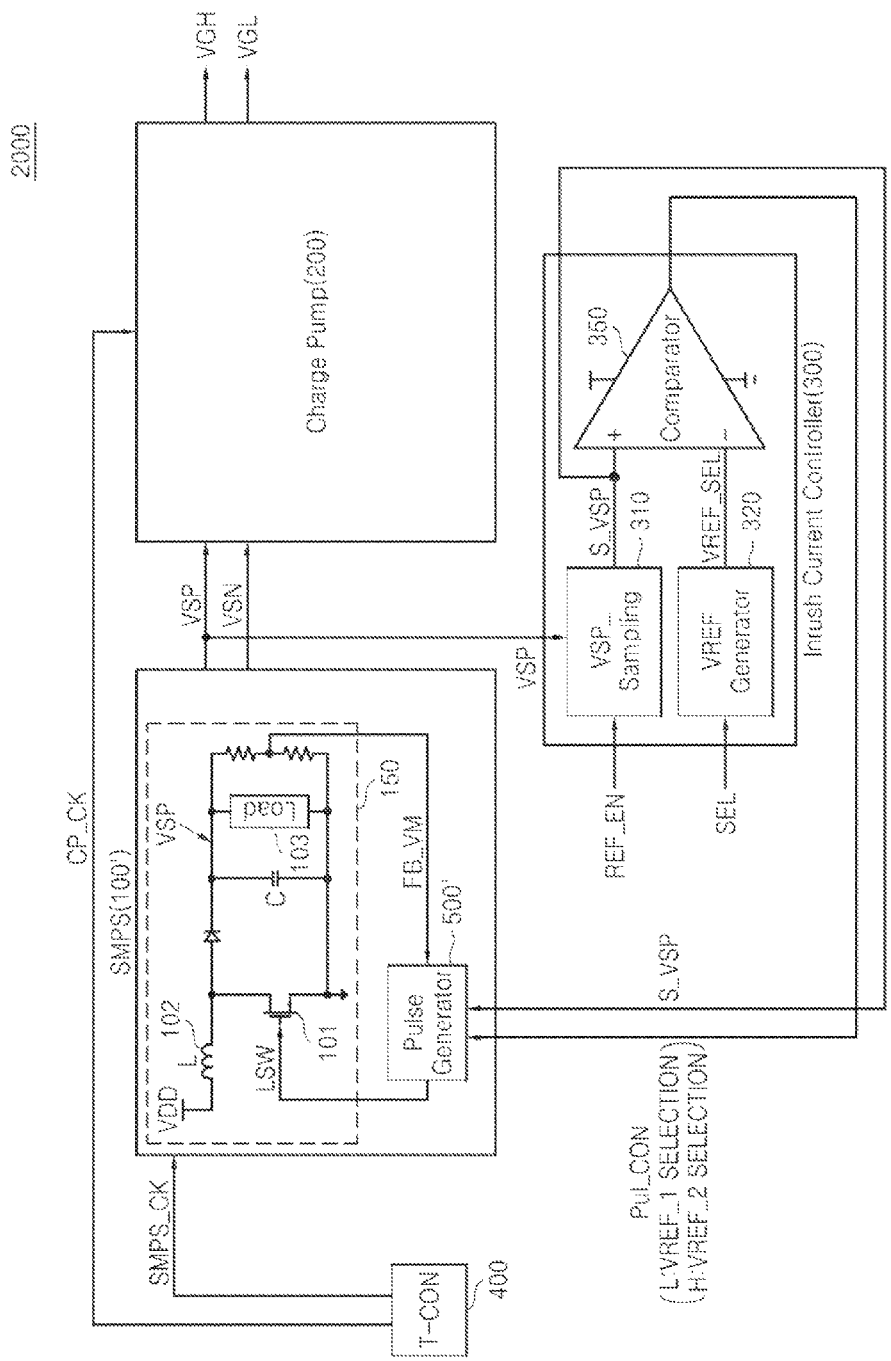
FIG. 10 is a detailed block diagram of the power supply illustrated in FIG. 9 according to an example embodiment.

FIG. 10 is a detailed block diagram of the power supply 2000 illustrated in FIG. 9.

Referring to FIG. 10, the power supply 2000 includes the internal power supply 100', the charge pump 200, the inrush current controller 300, and the timing controller 400. The description of the power supply 2000 will focus on the differences from the description of FIG. 9.

The internal power supply 100' includes the first voltage generator 150 and the pulse generator 500'. The first voltage generator 150 includes the first switch 101, the inductor 102, and the load circuit 103. In the operation of the internal power supply 100', the switch pulse LSW generated by the pulse generator 500' is applied to the control terminal of the first switch 101. When the first switch 101 is turned on, energy from the supply voltage VDD is accumulated at the inductor 102. When the first switch 101 is turned off, the energy accumulated at the inductor 102 is discharged to the load circuit 103. When this operation is repeated at a predetermined interval, the first voltage (VSP and VSN) is generated. The first voltage generator 150 divides the first voltage (VSP and VSN) and generates the feedback signal FB_VM. The feedback signal FB_VM is applied to the pulse generator 500' and is reflected on the generation of the switching pulse LSW.

The inrush current controller 300 includes the first sampling block 310, the reference voltage generator 320, and the first comparator 350.

When a first enable signal REF_EN is not applied to the inrush current controller 300, the pulse generator 500' in the internal power supply 100' applies the switching pulse LSW to the first voltage generator 150 based on the feedback signal FB_VM received from the first voltage generator 150. However, when the first enable signal REF_EN is applied to the inrush current controller 300, the inrush current controller 300 generates the pulse width modulation control signal Pul_CON. The pulse width modulation control signal Pul_CON is used to select the soft bias signal related with the slope of a square wave and is applied to the pulse generator 500' to control a pulse width. The soft bias signal Sig1 is based on a second reference voltage signal VREF_1_SELECTION or VREF_2_SELECTION.

The pulse generator 500' generates the switching pulse LSW using pulse width modulation to control the amount of inrush current supplied to the charge pump 200. The operation principle of the pulse generator 500' will be described in detail with reference to FIG. 11.

Figure 11:
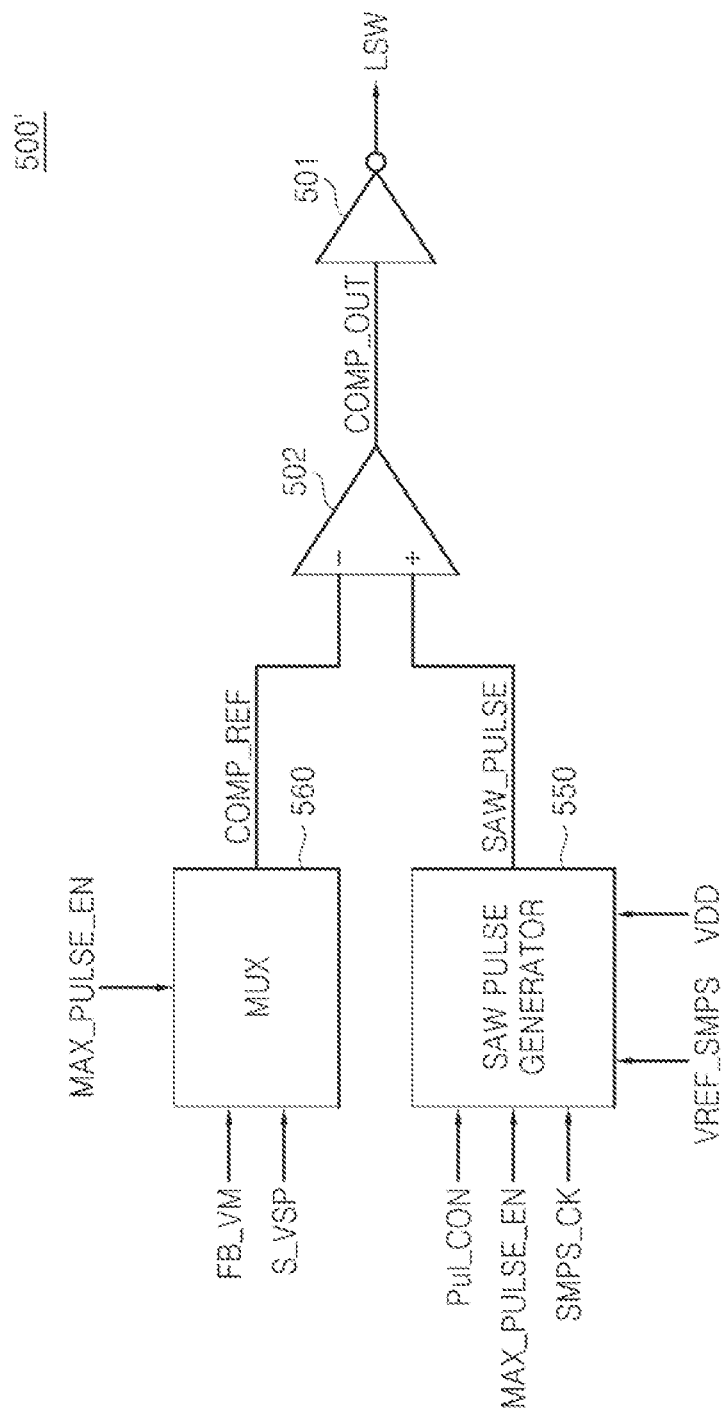
FIG. 11 is a block diagram of a pulse generator illustrated in FIG. 10 according to an example embodiment.

FIG. 11 is a block diagram of the pulse generator 500' illustrated in FIG. 10.

Referring to FIG. 11, the pulse generator 500' includes a saw pulse generator 550, a saw pulse comparison signal generator 560, and a second comparator 502.

The saw pulse generator 550 generates a saw pulse SAW_PULSE with an adjusted slope in response to the pulse width modulation control signal Pul_CON and a second enable signal MAX_PULSE_EN. At this time, the saw pulse SAW_PULSE may be generated using the clock signal SMPS_CK, an internal reference voltage VREF_SMPS, and the supply voltage VDD in the internal power supply 100'.

The saw pulse comparison signal generator 560 outputs the comparison target signal S_VSP or the feedback signal FB_VM as a saw pulse comparison signal COMP_REF in response to the second enable signal MAX_PULSE_EN.

The second comparator 502 receives the saw pulse SAW_PULSE through a non-inverting terminal (+) and the saw pulse comparison signal COMP_REF through an inverting terminal (−), compares the saw pulse SAW_PULSE with the saw pulse comparison signal COMP_REF, and outputs a comparison result COMP_OUT as the switching pulse LSW.

The pulse generator 500' may include an inverter 501. The inverter 501 inverts the comparison result COMP_OUT of the second comparator 502 and outputs the switching pulse LSW to be appropriate for the switching operation of the first voltage generator 150. The structure and the operations of the pulse generator 500' will be described in detail with reference to FIGS. 12 through 15.

Figure 12:
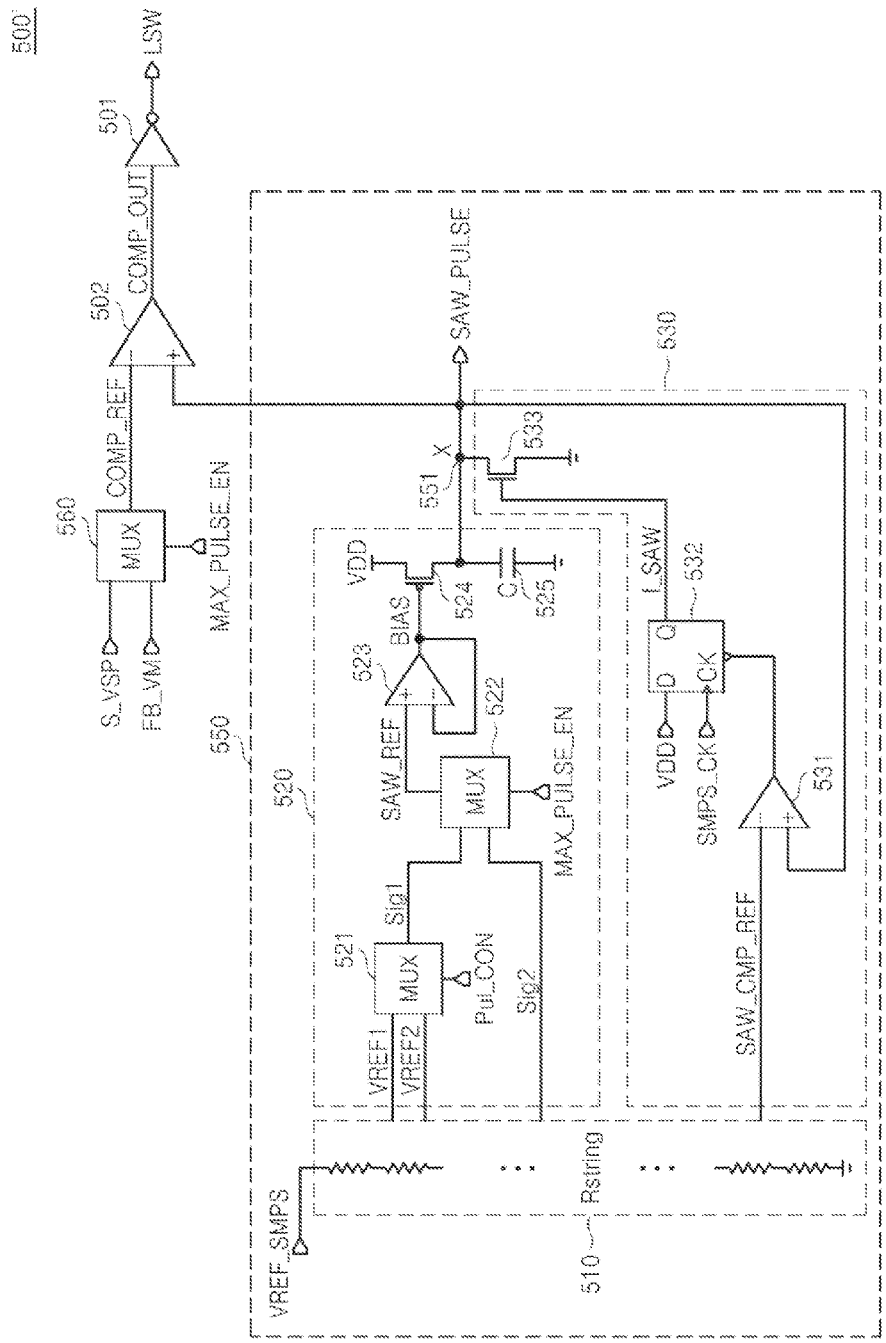
FIG. 12 is a diagram illustrating the internal structure of the pulse generator illustrated in FIG. 11 according to some example embodiments.

FIG. 12 is a diagram illustrating the internal structure of the pulse generator 500' illustrated in FIG. 11 according to some example embodiments. Referring to FIG. 12, the pulse generator 500' includes the saw pulse generator 550, the saw pulse comparison signal generator 560, and the second comparator 502.

The saw pulse generator 550 includes a second generation block 510, a first waveform generator 520, and a second waveform generator 530.

The second generation block 510 generates a plurality of secondary reference voltages by performing voltage division using a plurality of resistors connected between the internal reference voltage VREF_SMPS and the ground terminal GND. At this time, the secondary reference voltages may include basic signals VREF1 and VREF2 of the soft bias signal Sig1, a maximum bias signal Sig2, and a saw pulse reset reference SAW_CMP_REF.

The first waveform generator 520 includes a bias selection circuit 522, a pull-up circuit 524, and a storage 525. The first waveform generator 520 is connected between the second generation block 510 and a saw pulse output terminal 551. The first waveform generator 520 selects one of the soft bias signal Sig1 and the maximum bias signal Sig2 as a saw pulse basic signal SAW_REF in response to the second enable signal MAX_PULSE_EN and pulls up a ground voltage in response to a bias signal BIAS based on the saw pulse basic signal SAW_REF to generate a first waveform.

The bias selection circuit 522 selects the soft bias signal Sig1 selected from among the secondary reference voltages in response to the pulse width modulation control signal Pul_CON or the maximum bias signal Sig2 in response to the second enable signal MAX_PULSE_EN and outputs the selected signal as the saw pulse basic signal SAW_REF.

For instance, when the second enable signal MAX_PULSE_EN is at a low level (that is, when the maximum pulse width is not enabled), the soft bias signal Sig1 is output as the saw pulse basic signal SAW_REF. When the second enable signal MAX_PULSE_EN is at a high level (that is, when the maximum pulse width is enabled), the maximum bias signal Sig2 is output as the saw pulse basic signal SAW_REF. The soft bias signal Sig1 is one of the secondary reference voltages VREF1 and VREF2 generated by the second generation block 510, which is selected in response to the pulse width modulation control signal Pul_CON. The maximum bias signal Sig2 may be a predetermined one of the secondary reference voltages VREF1 and VREF2 generated by the second generation block 510.

The first waveform generator 520 may also include a stabilization circuit 523 for the stable output of the bias signal BIAS. The stabilization circuit 523 may be a buffer that outputs the saw pulse basic signal SAW_REF as the bias signal BIAS but may be implemented in other various ways.

The pull-up circuit 524 is connected between the supply voltage VDD and a saw pulse output terminal X and pulls up a voltage of the saw pulse output terminal X in response to the bias signal BIAS. The pull-up circuit 524 may be a switch implemented by a PMOS transistor but may be implemented in different ways.

The storage 525 is connected between the saw pulse output terminal X and the ground terminal GND. The storage 525 stores a pulled-up signal and generates a first waveform. The first waveform may be a rising waveform of a saw pulse.

The second waveform generator 530 includes a second sampling block and a pull-down circuit 533.

The second sampling block includes a comparator 531 and a latch circuit 532. The second sampling block is connected between the supply voltage VDD and the saw pulse output terminal X to output a falling signal f_SAW obtained by sampling the supply voltage VDD in response to the clock signal SMPS_CK of the internal power supply 100 after resetting the latch circuit 532. The comparator 531 compares the saw pulse SAW_PULSE fed back from the saw pulse output terminal X with the predetermined saw pulse reset reference SAW_CMP_REF and generates a reset signal.

The pull-down circuit 533 is connected between the saw pulse output terminal X and the ground terminal GND and pulls down the voltage of the saw pulse output terminal X in response to the falling signal f_SAW. The pull-down circuit 533 may be a switch implemented by an NMOS transistor but may be implemented in different ways.

In response to the second enable signal MAX_PULSE_EN, the saw pulse comparison signal generator 560 outputs the comparison target signal S_VSP as the saw pulse comparison signal COMP_REF during the soft pulse period (while the second enable signal MAX_PULSE_EN is not enabled, that is, it is at the low level) and outputs the feedback signal FB_VM as the saw pulse comparison signal COMP_REF during the maximum pulse period (while the second enable signal MAX_PULSE_EN is enabled, that is, it is at the high level).

As described above, the second comparator 502 receives the saw pulse SAW_PULSE through the non-inverting terminal (+) and the saw pulse comparison signal COMP_REF through the inverting terminal (−), compares the saw pulse SAW_PULSE with the saw pulse comparison signal COMP_REF, and outputs the comparison result COMP_OUT as the switching pulse LSW.

Consequently, when the soft bias signal Sig1 is selected in response to the pulse width modulation control signal Pul_CON, the bias signal BIAS determining the slope of a saw pulse is output corresponding to the soft bias signal Sig1.

For instance, when the bias signal BIAS increases, the slope of the first waveform also increases. When the slope of the first waveform increases, the pulse width of the comparison result COMP_OUT generated as a result of comparing the saw pulse SAW_PULSE with the saw pulse comparison signal COMP_REF also increases. As a result, the pulse width of the switching pulse LSW is decreased since the comparison result COMP_OUT is inverted. On the other hand, when the bias signal BIAS decreases, the slope of the first waveform also decreases. When the slope of the first waveform decreases, the pulse width of the comparison result COMP_OUT generated as a result of comparing the saw pulse SAW_PULSE with the saw pulse comparison signal COMP_REF also decreases. As a result, the pulse width of the switching pulse LSW is increased since the comparison result COMP_OUT is inverted.

The pulse generator 500 generates the switching pulse LSW applied to the first switch 101 in the internal power supply 100 by controlling pulse width modulation according to the above-described principle. The amount of inrush current flowing from the internal power supply 100 to the charge pump 200 is controlled based on the switching pulse LSW, reducing peak current. As a result, latch-up is prevented.

Figure 13:
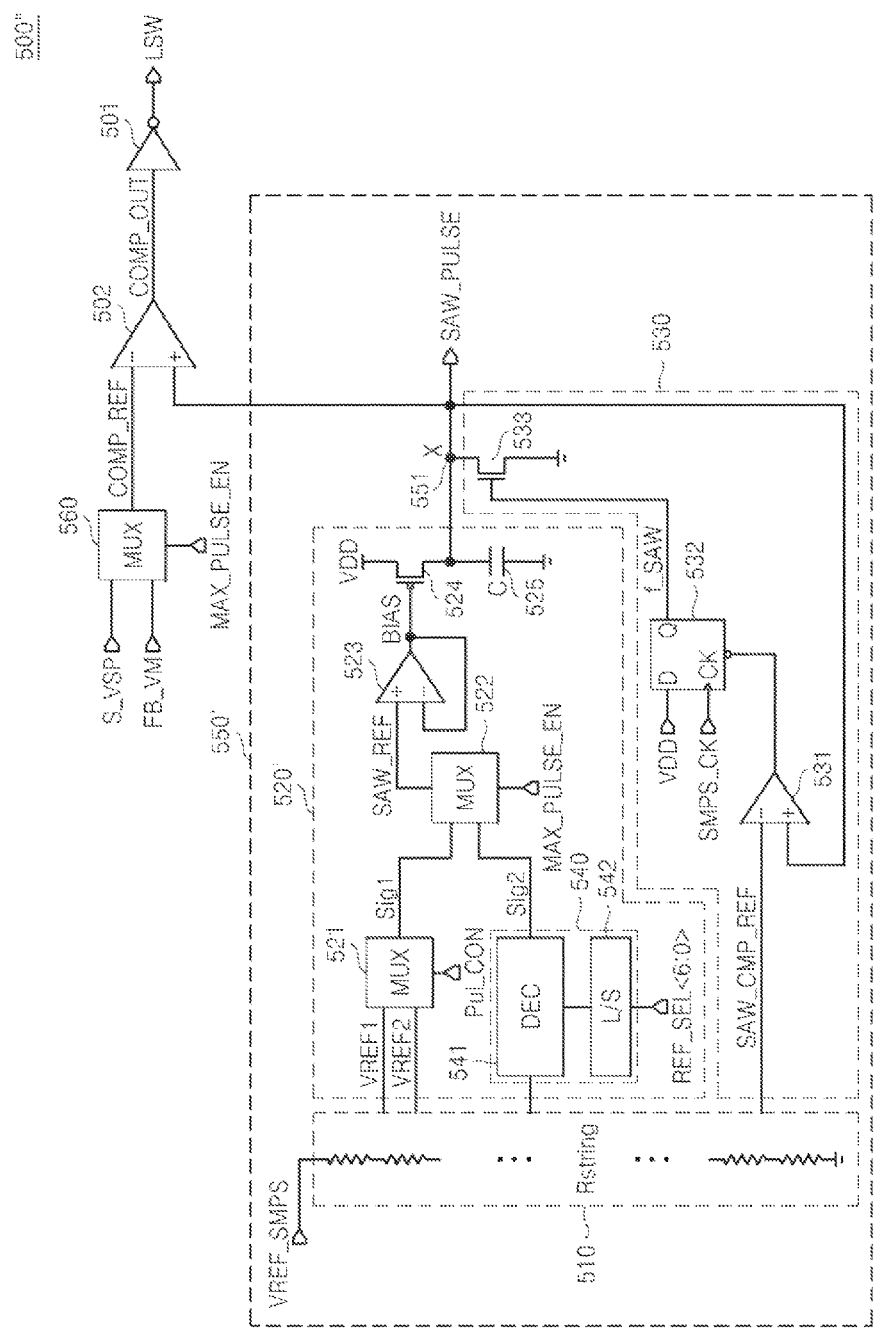
FIG. 13 is a diagram illustrating the internal structure of the pulse generator illustrated in FIG. 11 according to other example embodiments.

FIG. 13 is a diagram illustrating the internal structure of a pulse according to other example embodiments. Referring to FIG. 13, a pulse generator 500" includes a saw pulse generator 550', the saw pulse comparison signal generator 560, and the second comparator 502. The description of FIG. 13 will focus on differences from FIG. 12.

A first waveform generator 520' includes the bias selection circuit 522, the pull-up circuit 524, and the storage 525. The first waveform generator 520' is connected between the second generation block 510 and the saw pulse output terminal 551. The first waveform generator 520' pulls up a ground voltage and generates a first waveform in response to a secondary reference voltage selected from among a plurality of secondary reference voltages in response to the second enable signal MAX_PULSE_EN.

The bias selection circuit 522 outputs the soft bias signal Sig1 or the maximum bias signal Sig2 as the bias signal BIAS in response to the second enable signal MAX_PULSE_EN. The soft bias signal Sig1 is one of the secondary reference voltages VREF1 and VREF2 generated by the second generation block 510, which is selected by a first circuit 521 in response to the pulse width modulation control signal Pul_CON.

Differently from the first waveform generator 520 illustrated in FIG. 12, the first waveform generator 520' illustrated in FIG. 13 also includes a second circuit 540 generating the maximum bias signal Sig2.

The second circuit 540 outputs the maximum bias signal Sig2 selected from among the secondary reference voltage generated by the second generation block 510 in response to a level selection signal REF_SEL. The level selection signal REF_SEL is N bits in length where N is 2 or a natural number greater than 2. The total voltage of the second generation block 510 may be divided into N voltages and one of the N voltages may be selected by the level selection signal REF_SEL. The second circuit 540 may include a decoder 541 and a level shifter 542 but may be implemented in different ways.

The first waveform generator 520' may also include the stabilization circuit 523 for the stable output of the bias signal BIAS. The stabilization circuit 523 may include a buffer.

Consequently, the maximum bias signal Sig2 may be set in various ways according to the first voltage (VSP) or the characteristics of the power supply 2000. In other words, the second circuit 540 and the pulse generator 500" including the same may control the slope of a saw pulse and reset the maximum pulse width PW_Max according to physical environments such as heat and temperature which may vary with operations.

Figure 14B:
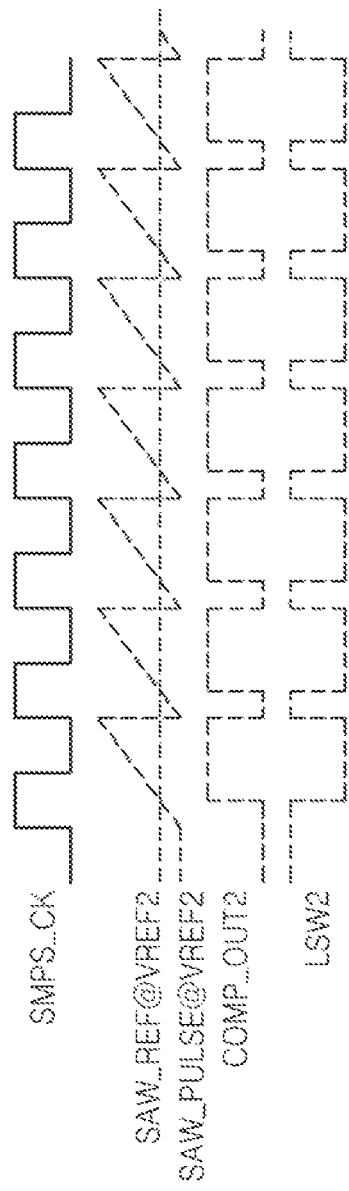
Figure 14C:
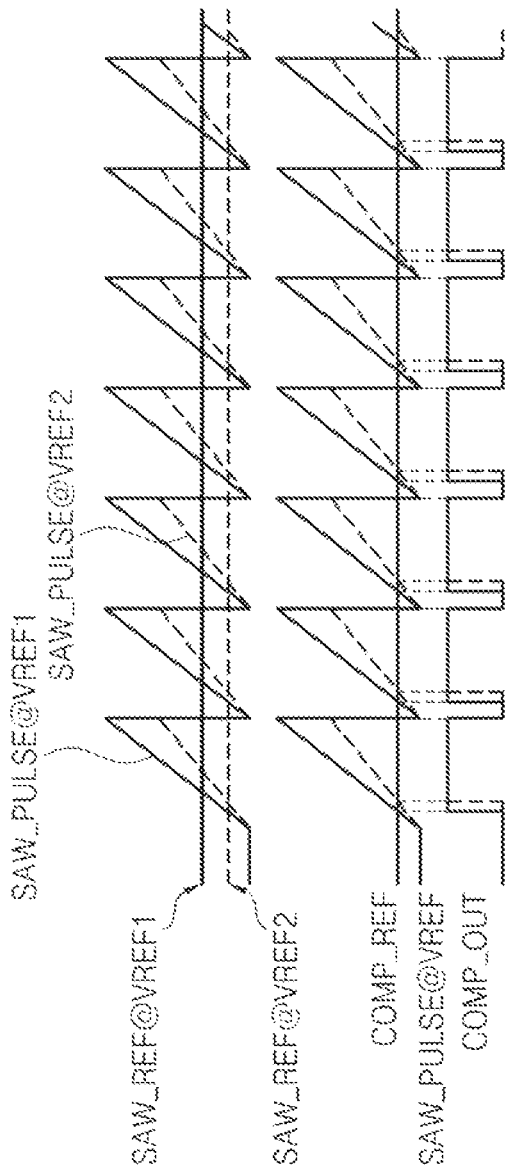

FIGS. 14A through 14C are signal timing charts showing the operation of a power supply according to other example embodiments. For clarity of the description, it is assumed that the secondary reference voltage VREF1 is higher than the secondary reference voltage VREF2.

FIG. 14A is a signal timing chart showing the operation when the secondary reference voltage VREF1 is selected as the saw pulse basic signal SAW_REF in response to the pulse width modulation control signal Pul_CON.

In the soft pulse period while the second enable signal MAX_PULSE_EN is at the low level, the first circuit 521 selects the secondary reference voltage VREF1 when the pulse width modulation control signal Pul_CON is at the low level. The secondary reference voltage VREF1 is transmitted to the stabilization circuit 523 and output by the stabilization circuit 523 as the bias signal BIAS. The supply voltage VDD is sampled by the latch circuit 532 in response to the clock signal SMPS_CK of the internal power supply 100, so that the falling signal f_SAW is generated. The pull-up circuit 524 and the storage 525 generate a first waveform (i.e., a rising waveform) in response to the bias signal BIAS. The pull-down circuit 533 generates a second waveform, i.e., a falling waveform in response to the falling signal f_SAW, so that a first saw pulse SAW_PULSE@VREF1 is generated based on the secondary reference voltage VREF1. The first saw pulse SAW_PULSE@VREF1 and the saw pulse comparison signal COMP_REF are applied to the non-inverting terminal (+) and the inverting terminal (−), respectively, and compared with each other by the second comparator 502. The second comparator 502 outputs a first comparison result COMP_OUT1. At this time, the first comparison result COMP_OUT1 is output at a high level when the first saw pulse SAW_PULSE@VREF1 is higher than the saw pulse comparison signal COMP_REF and is output at a low level when the first saw pulse SAW_PULSE@VREF1 is lower than the saw pulse comparison signal COMP_REF. The first comparison result COMP_OUT1 is inverted by the inverter 501 and then output as a first switching pulse LSW1.

FIG. 14B is a signal timing chart showing the operation when the secondary reference voltage VREF2 is selected as the saw pulse basic signal SAW_REF in response to the pulse width modulation control signal Pul_CON.

A second saw pulse SAW_PULSE@VREF2 is generated according to the same principle as that described above with reference to FIG. 14A. However, since the secondary reference voltage VREF2 is lower than the secondary reference voltage VREF1, the slope of the second saw pulse SAW_PULSE@VREF2 is less than that of the first saw pulse SAW_PULSE@VREF1. A second comparison result COMP_OUT2 and a second switching pulse LSW2 are generated based on the second saw pulse SAW_PULSE@VREF2.

FIG. 14C is a signal timing chart showing the comparison between when the secondary reference voltage VREF1 is selected as the saw pulse basic signal SAW_REF and when the secondary reference voltage VREF2 is selected as the saw pulse basic signal SAW_REF.

Since the saw pulse basic signal SAW_REF is higher when the secondary reference voltage VREF1 is selected than when the secondary reference voltage VREF2 is selected, the slope of the first saw pulse SAW_PULSE@VREF1 is greater than the slope of the second saw pulse SAW_PULSE@VREF2. The first or second saw pulse SAW_PULSE@VREF1 or SAW_PULSE@VREF2 is compared with the saw pulse comparison signal COMP_REF and the comparison result COMP_OUT is generated. In detail, when the first or second saw pulse SAW_PULSE@VREF1 or SAW_PULSE@VREF2 is higher than the saw pulse comparison signal COMP_REF, the comparison result COMP_OUT is output at the high level. When the first or second saw pulse SAW_PULSE@VREF1 or SAW_PULSE@VREF2 is lower than the saw pulse comparison signal COMP_REF, the comparison result COMP_OUT is output at the low level. Since the slope of the first saw pulse SAW_PULSE@VREF1 is greater than the slope of the second saw pulse SAW_PULSE@VREF2, the pulse width of the comparison result COMP_OUT is greater when the first saw pulse SAW_PULSE@VREF1 is used than when the second saw pulse SAW_PULSE@VREF2 is used. The comparison result COMP_OUT is inverted by the inverter 501 and then output as the switching pulse LSW, and therefore, the pulse width of the switching pulse LSW decreases as the slope of the saw pulse SAW_PULSE increases.

As described above, the slope of saw pulse SAW_PULSE is controlled using the pulse width modulation control signal Pul_CON during a soft pulse period while the second enable signal MAX_PULSE_EN is at the low level, so that the width of the switching pulse LSW is controlled.

FIG. 15 is a signal timing chart showing the operation of a power supply according to further example embodiments.

Referring to FIGS. 4 and 15, the clock signals SMPS_CK and CP_CK having different frequencies are generated by the timing controller 400 and applied to the internal power supply 100 and the charge pump 200, respectively.

The first comparator 350 in the inrush current controller 300 outputs the pulse width modulation control signal Pul_CON at the low level when the comparison target signal S_VSP is lower than the selection reference voltage VREF_SEL and outputs the pulse width modulation control signal Pul_CON at the high level when the comparison target signal S_VSP is higher than the selection reference voltage VREF_SEL.

For instance, as illustrated in FIG. 4, when the first primary reference voltage VREF_SEL1 is input as the selection reference voltage VREF_SEL to the first comparator 350, the first comparator 350 outputs a first pulse width modulation control signal Pul_CON1. When the second primary reference voltage VREF_SEL2 is input as the selection reference voltage VREF_SEL to the first comparator 350, the first comparator 350 outputs a second pulse width modulation control signal Pul_CON2. The first or second pulse width modulation control signal Pul_CON1 or Pul_CON2 is applied to the pulse generator 500 of the internal power supply 100.

When the second enable signal MAX_PULSE_EN at the low level is input to the second circuit 522 and the first pulse width modulation control signal Pul_CON1 is input to the first circuit 521, the pulse generator 500 selects the voltage VREF1 from among the secondary reference voltages as the soft bias signal Sig1 if the first pulse width modulation control signal Pul_CON1 is at the low level and outputs the first switching pulse LSW1 having a first pulse width PW1 based on the soft bias signal Sig1. On the other hand, if the first pulse width modulation control signal Pul_CON1 is at the high level, the pulse generator 500 selects the voltage VREF2 from among the secondary reference voltages as the soft bias signal Sig1 and outputs the second switching pulse LSW2 having a second pulse width PW2 based on the soft bias signal Sig1.

When the second enable signal MAX_PULSE_EN at the high level is input to the second circuit 522, the pulse generator 500 selects the maximum bias signal Sig2 from among the secondary reference voltage in response to the level selection signal REF_SEL and outputs the switching pulse LSW1 or LSW2 having a maximum pulse width PW_MAX based on the maximum bias signal Sig2.

The internal power supply 100 generates the first voltage (VSP and VSN) and inrush current, which will be input to the charge pump 100, based on the switching pulse LSW. When the inrush current is gradually supplied to the charge pump 200, the charge pump 200 is enabled before the switching pulse LSW having the maximum pulse width PW_MAX is generated, so that a large amount of current is not momentarily input to the charge pump 200. As a result, latch-up is prevented. In example embodiments, either of the two voltages VREF1 and VREF2 is used as the soft bias signal Sig1 according to the state of the pulse width modulation control signal Pul_CON, but the example embodiments are not restricted thereto. In other example embodiments, the pulse width, the number of reference voltages used for a soft bias signal, and the levels of the reference voltages may be changed in various ways.

FIG. 16 is a block diagram of a power supply 2000' according to other example embodiments.

Referring to FIG. 16, the power supply 2000' includes an internal power supply 100", the charge pump 200, and the timing controller 400. The description of the power supply 2000' illustrated in FIG. 16 will focus on differences from the power supply 2000 illustrated in FIG. 9.

Unlike the power supply 2000 illustrated in FIG. 9, the power supply 2000' illustrated in FIG. 16 does not include the inrush current controller 300. The internal power supply 100" includes the first voltage generator 150 and a pulse module 600. The pulse module 600 includes the pulse generator 500 and a control signal generator 650.

The internal power supply 100" applies the first voltage (VSP) to the pulse modulator 600 as well as the charge pump 200. The control signal generator 650 of the pulse module 600 generates a control signal SEL_Sig for controlling pulse width modulation based on the first voltage (VSP). The pulse generator 500 generates the soft bias signal Sig1 in response to the control signal SEL_Sig and generates the switching pulse LSW having a pulse width corresponding to the soft bias signal Sig1. The control signal SEL_Sig may be in two bits in length but may be implemented in other various ways.

In other words, the power supply 2000' controls the amount of inrush current flowing into the charge pump 200 without the inrush current controller 300 by controlling the pulse width modulation of the internal power supply 100 based on the first voltage.

FIG. 17 is a flowchart of a power supply method according to other example embodiments.

Referring to FIG. 17, the power supply method is performed by a power supply including the internal power supply 100" performing a switching operation and the charge pump 200.

When the first enable signal REF_EN is applied to the inrush current controller 300, the comparison target signal S_VSP is generated in operation S100. The inrush current controller 300 generates the selection reference voltage VREF_SEL from the supply voltage VDD in operation S110. The inrush current controller 300 compares the comparison target signal S_VSP with the selection reference voltage VREF_SEL and generates the pulse width modulation control signal Pul_CON in operation S120.

The pulse width modulation control signal Pul_CON is applied to the internal power supply 100 and the pulse generator 500 in the internal power supply 100 generates a first waveform, i.e., a rising waveform using a pull-up operation based on the second enable signal MAX_PULSE_EN and the pulse width modulation control signal Pul_CON in operation S130. At this time, the slope of the first waveform changes according the soft bias signal Sig1 selected based on the pulse width modulation control signal Pul_CON. The pulse generator 500 generates a second waveform, i.e., a falling waveform by pulling down the first waveform according to the clock signal SMPS_CK of the internal power supply 100 in operation S140 and generates the saw pulse SAW_PULSE combining the first waveform and the second waveform in operation S150. Meanwhile, for the fine tuning of the control of inrush current, the pulse generator 500 selects either the comparison target signal S_VSP or the feedback signal FB_VM as the saw pulse comparison signal COMP_REF in response to the second enable signal MAX_PULSE_EN in operation S160. The pulse generator 500 compares the saw pulse SAW_PULSE with the saw pulse comparison signal COMP_REF and generates the switching pulse LSW in operation S170. The width of the switching pulse LSW is controlled according to the slope of the saw pulse SAW_PULSE.

The internal power supply 100 generates the first voltage (VSP and VSN) and inrush current in response to the switching pulse LSW in operation S180. The charge pump 200 generates the second voltage from the first voltage and the inrush current in operation S190. As a result, the operation of the charge pump 200 is enabled according to the amount of inrush current before the switching pulse LSW having the maximum pulse width PW_MAX is generated, so that the latch-up of the charge pump 200 is prevented.

Figure 18B:
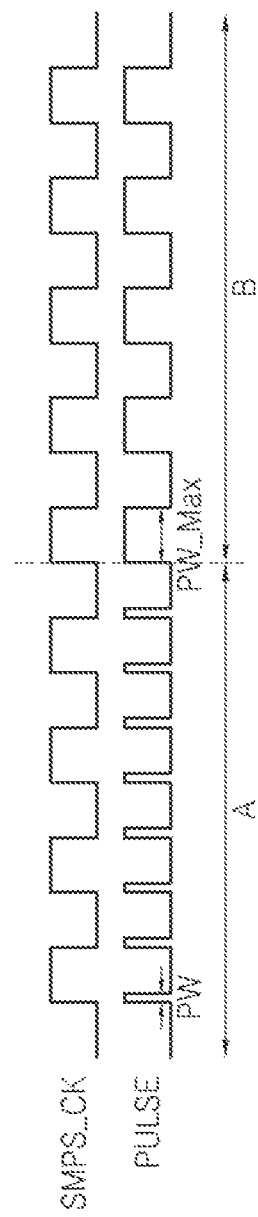

FIGS. 18A and 18B are a diagram showing the waveforms in the power supply 1000 and a timing chart of input signals in the power supply 1000, according to some example embodiments. Referring to FIGS. 18A and 18B, a pulse width is controlled according to the level of the first voltage (VSP) during a soft pulse period A in the operation of the internal power supply 100 using pulse width modulation to control the amount of inrush current input to the charge pump 200.

In detail, referring to FIG. 18A, when the comparison target signal S_VSP obtained by sampling the first voltage (VSP) output from the internal power supply 100 is higher than the selection reference voltage VREF_SEL, the charge pump 200 is enabled and generates the second voltage (VGH and VGL). At this time, the energy stored in the inductor 102 is restricted through the control of the pulse width modulation, thereby preventing peak current from occurring at the power-on of the power supply 1000.

Referring to FIG. 18B, energy from the supply voltage VDD is restrictedly supplied to the inductor 102 in the internal power supply 100 according to a soft pulse width PW of a pulse, so that the first voltage (VSP) is gradually increased in the soft pulse period A. When the first voltage (VSP) reaches at least a predetermined level, the internal power supply 100 enables the charge pump 200 to operate in the soft pulse period A due to the operation of the inrush current controller 300 or the pulse generator 500 and supplies inrush current to the charge pump 200. Only when the energy of the inductor 102 reaches a predetermined maximum level, the internal power supply 100 increases the inrush current supplied to the charge pump 200 using a maximum pulse width PW_MAX of the pulse in a maximum pulse period B, so that latch-up is prevented. At this time, the pulse widths PW and PW_MAX may vary design in different example embodiments.

Figure 19:
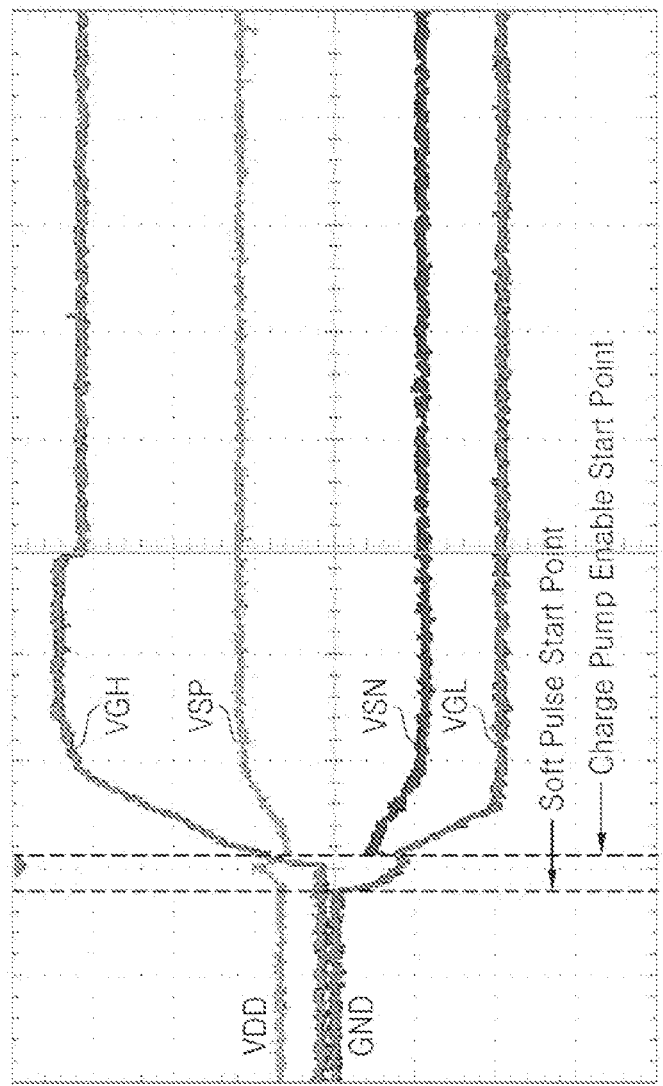
FIG. 19 is a graph showing output signals of a power supply according to some example embodiments.

FIG. 19 is a graph showing output signals of a power supply according to some example embodiments.

Referring to FIG. 19, when the first voltage (VSP and VSN) and the second voltage (VGH and VGL) are generated from the supply voltage VDD, latch-up does not occur.

In detail, when the enable signal REF_EN is applied to the inrush current controller 300, the switching pulse LSW reflecting a result of comparing the selection reference voltage VREF_SEL with the comparison target signal S_VSP obtained by sampling the first voltage is applied to the control terminal of the first switch 101 in the internal power supply 100, so that the first voltage (VSP) is gradually formed from a soft pulse start point. When the first voltage (VSP) reaches at least a predetermined level, the internal power supply 100 enables the charge pump 200 at a charge pump enable start point before a soft pulse period ends so that inrush current gradually flows into the charge pump 200. As a result, the first voltage is normally boost up without latch-up and the second voltage (VGH) is generated. According to the same principle as described above, negative voltages VSN and VGL are generated.

Figure 20:
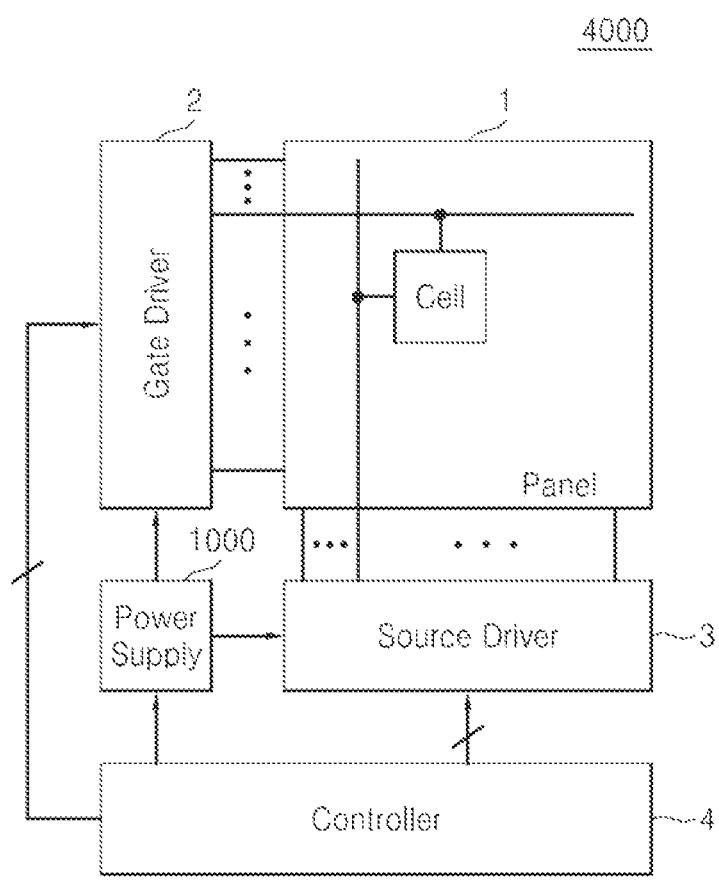
FIG. 20 is a block diagram of a display system including a power supply according to some example embodiments.

FIG. 20 is a block diagram of a display system 4000 including the power supply 1000 according to some example embodiments. Referring to FIG. 20, the display system 4000 includes a panel 1, a source driver 3, a gate driver 2, a controller 4, and the power supply 1000.

The panel 1 includes a plurality of data lines, a plurality of gate lines, and a plurality of pixels connected with the data lines and the gate lines.

The source driver 3 generates analog voltages for driving the data lines (or source lines) in the panel 1 in response to control signals output from the controller 4 and a voltage output from the power supply 1000.

The gate driver 2 sequentially drives the gate lines (or scan lines) in the panel 1 in response to control signals output from the controller 4 and the voltage output from the power supply 1000 so that the analog voltages output from the source driver 3 are provided to the pixels.

The power supply 1000 described with reference to FIGS. 1 through 17 provides a boosted voltage, i.e., the second voltage to the source driver 3 or the gate driver 2 in response to a signal output from the controller 4. The controller 4 generates timing control signals to control the operation timing of the data lines connected with the source driver 2 and the operation timing of the gate lines connected with the gate driver 2.

Figure 21:
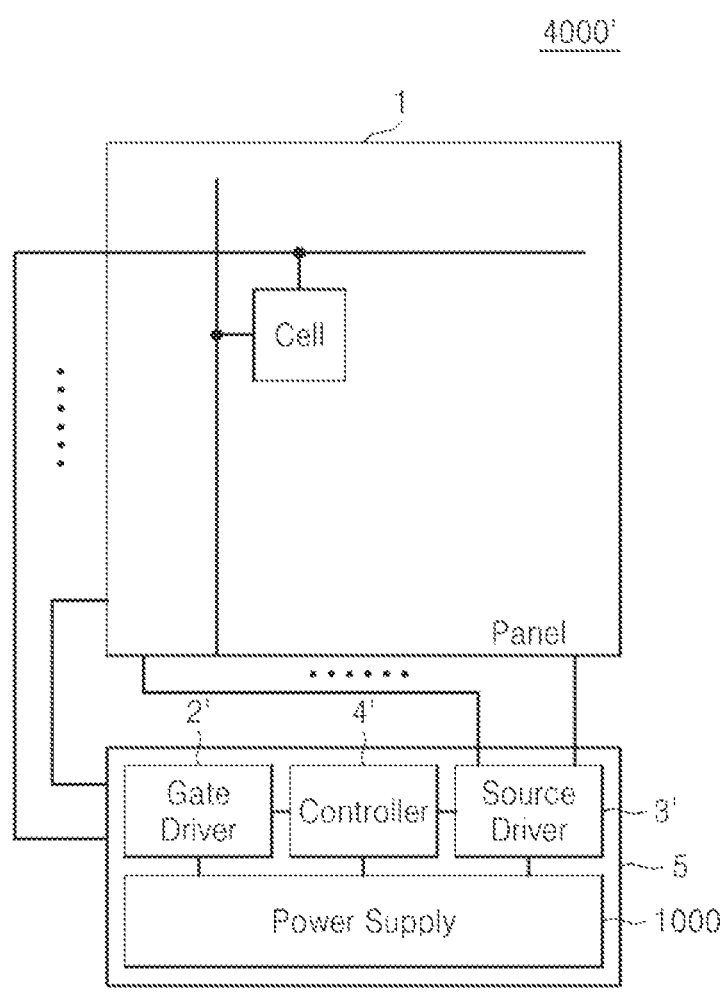
FIG. 21 is a block diagram of a display system including a power supply according to other example embodiments.

FIG. 21 is a block diagram of a display system 4000' including the power supply 1000 according to other example embodiments. Referring to FIG. 21, the display system 4000' includes the panel 1 and a display driver 5.

The display driver 5 includes a source driver 3', a gate driver 2', a controller 4', and the power supply 1000. The display driver 5 may be implemented in a single chip or package as illustrated in FIG. 21, but example embodiments are not restricted thereto.

Figure 22:
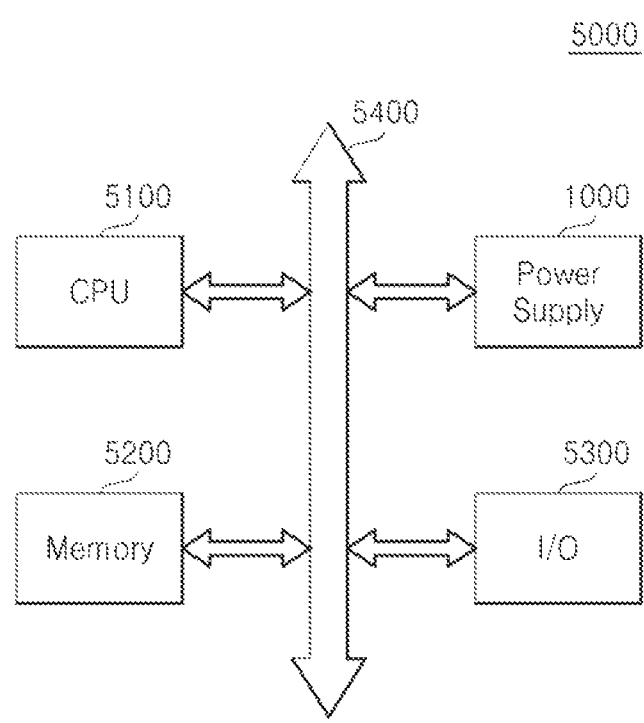
FIG. 22 is a block diagram of an electronic device including a power supply according to some example embodiments.

FIG. 22 is a block diagram of an electronic device including a power supply according to some example embodiments. Referring to FIG. 22, the electronic device 5000 includes the power supply 1000, a central processing unit (CPU) 5100, a memory device 5200, an input/output interface unit 5300 and a bus 5400.

The CPU 5100 may control data exchange between the power supply 1000, a memory device 5200 and the input/output interface unit 5300 via the bus 5400.

The memory device 5200 may be implemented as a non-volatile memory device. The non-volatile memory device may include a plurality of non-volatile memory cells.

Each of the non-volatile memory cells may be implemented as an EEPROM (Electrically Erasable Programmable Read-Only Memory), a flash memory, a MRAM (Magnetic RAM), a MRAM (Spin-Transfer Torque MRAM), a conductive bridging RAM (CBRAM), a FeRAM (Ferroelectric RAM), a PRAM (Phase change RAM) called as a OUM (Ovonic Unified Memory), a Resistive RAM (RRAM or ReRAM), a Nanotube RRAM, a Polymer RAM (PoRAM), a Nano Floating Gate Memory (NFGM), a holographic memory, a Molecular Electronics Memory, or an Insulator Resistance Change Memory.

The electronic device 5000 may be a PC, a portable computer, a portable mobile communication device, or consumer equipment (CE). The portable mobile communication device includes personal digital assistants (PDA) and a portable multimedia player (PMP). The electronic device 5000 may also be an e-book, a game device, a game controller, a navigator or an electronic musical instrument.

The inventive concepts can be embodied as hardware, software, or combinations of hardware and software. The inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the inventive concepts can be easily construed by programmers skilled in the art to which the inventive concepts pertain.

As described above, according to some example embodiments, the amount of inrush current input to a charge pump is controlled by controlling a pulse width based on a result of comparing an input signal of a charge pump with a selection reference voltage, thereby preventing latch-up in a power supply. As a result, the power supply does not require an external Schottky diode, thereby reducing manufacturing price. In addition, an internal Schottky diode can be removed from the power supply, so that a chip size is reduced. Furthermore, peak current is reduced during charge pumping, so that a stress put on a contact is reduced and power consumption is also reduced.

While example embodiments have been particularly shown and described, it will be understood by those of ordinary skill in the art that various changes in forms and details may be made therein without departing from the spirit and scope of example embodiments as defined by the following claims.

What is claimed is:

1. A power supply apparatus comprising:
an internal power supply including a first voltage generator configured to generate a first voltage based on a pulse width modulation control signal;
a charge pump configured to receive the first voltage and generate a second voltage; and
an inrush current controller configured to be connected between the charge pump and the internal power supply and configured to generate the pulse width modulation control signal based on a target signal and a selection reference voltage, the inrush current controller including,
a reference voltage generator configured to output the selection reference voltage in response to a reference voltage selection signal, the reference voltage generator including,
a first generation circuit configured to divide a supply voltage using a plurality of resistors and generate a plurality of primary reference voltages based on dividing the supply voltage, and
a selection circuit configured to output one of the primary reference voltages as the selection reference voltage in response to the reference voltage selection signal.

2. The power supply apparatus of claim 1, wherein the inrush current controller comprises:
a first sampling circuit configured to divide the first voltage in response to a first enable signal and output the target signal based on the division; and
a first comparator configured to compare the target signal with the selection reference voltage and output the pulse width modulation control signal.

3. The power supply apparatus of claim 1, wherein the first voltage generator is configured to generate a feedback signal, the internal power supply includes a pulse generator configured to generate a pulse based on the feedback signal, and if the pulse width modulation control signal generated by the inrush current controller is applied to a timing controller, the pulse generator generates the pulse having a pulse width corresponding to the pulse width modulation control signal and applies the pulse to the first voltage generator.

4. The power supply apparatus of claim 1, wherein the internal power supply is a switching mode power supply.

5. A power supply apparatus comprising:
an internal power supply including a first voltage generator configured to generate a first voltage based on a pulse width modulation control signal;
a charge pump configured to receive the first voltage and generate a second voltage; and
an inrush current controller configured to be connected between the charge pump and the internal power supply and configured to generate the pulse width modulation control signal based on a target signal and a selection reference voltage, wherein if a timing controller applies pulses respectively having different pulse widths to the internal power supply, the internal power supply selects one of the pulses in response to the pulse width modulation control signal generated by the inrush current controller and generates the first voltage.

6. A power supply apparatus comprising:
an internal power supply including a first voltage generator configured to generate a first voltage based on a pulse width modulation control signal;
a charge pump configured to receive the first voltage and generate a second voltage; and
an inrush current controller configured to be connected between the charge pump and the internal power supply and configured to generate the pulse width modulation control signal based on a target signal and a selection reference voltage, wherein the first voltage generator is configured to generate a feedback signal and the internal power supply includes a pulse generator configured to generate a pulse based on the feedback signal, the pulse generator includes,
a saw pulse generator configured to generate a saw pulse having a slope, the saw pulse based on the pulse width modulation control signal and a second enable signal;
a saw pulse comparison signal generator configured to output the target signal or the feedback signal as a saw pulse comparison signal in response to the second enable signal; and
a second comparator configured to compare the saw pulse with the saw pulse comparison signal and generate a switching pulse.

7. The power supply apparatus of claim 6, wherein the saw pulse generator comprises:
a second generation circuit configured to divide an internal reference voltage using a plurality of resistors and generate a plurality of secondary reference voltages based on the division;
a first waveform generator configured to be connected between the second generation circuit and a saw pulse output terminal, select a voltage among the secondary reference voltages based on the second enable signal, and configured to generate a first waveform by pulling up a ground voltage in response to the voltage selected from among the secondary reference voltages; and
a second waveform generator configured to be connected between the second generation circuit and the saw pulse output terminal and configured to generate a second waveform by pulling down a voltage of the saw pulse output terminal in response to a falling signal, the falling signal generated within the second waveform generator, the falling signal based on sampling a supply voltage according to a clock signal of the internal power supply.

8. The power supply apparatus of claim 7, wherein the first waveform generator comprises:
a bias circuit configured to output a one of the secondary reference voltages as a soft bias signal in response to the pulse width modulation control signal or output a maximum bias signal as a saw pulse basic signal in response to the second enable signal;
a pull-up circuit configured to pull up the voltage of the saw pulse output terminal in response to the saw pulse basic signal; and
a storage configured to be connected between the saw pulse output terminal and a ground terminal, the storage configured to store a pulled-up signal and generate the first waveform.

9. The power supply apparatus of claim 7, wherein the first waveform generator comprises:
a first circuit configured to select and output one of the secondary reference voltages as a soft bias signal in response to the pulse width modulation control signal;
a second circuit configured to select and output one of the secondary reference voltages as a maximum bias signal in response to a level selection signal;
a bias circuit configured to output the soft bias signal or the maximum bias signal as a saw pulse basic signal in response to the second enable signal; and
a pull-up circuit configured to generate the first waveform by pulling up the ground voltage in response to the saw pulse basic signal.

10. The power supply apparatus of claim 7, wherein the second waveform generator comprises:
a second sampling circuit configured to perform a reset operation based on the saw pulse and a saw pulse reset reference, and output the falling signal; and
a pull-down circuit configured to pull down a voltage of the saw pulse output terminal in response to the falling signal.

11. The power supply apparatus of claim 6, wherein the saw pulse comparison signal generator is configured to output the target signal as the saw pulse comparison signal in response to the second enable signal during a soft pulse period and output the feedback signal as the saw pulse comparison signal in response to the second enable signal during a maximum pulse period.

12. A power supply comprising:
a charge pump configured to receive a first voltage and generate a second voltage based on the first voltage;
an internal power supply configured to generate the first voltage based on a pulse width of a switching pulse, the internal power supply including,
a pulse generator configured to generate the switching pulse based on a modulation control signal, the modulation control signal and second voltage being different signals,
the modulation control signal based on a comparison between a target signal and a selection reference voltage; and
a current controller configured to select the selection reference voltage from a plurality of reference voltages, generate the target signal based on the first voltage and determine the modulation control signal based on the target signal and the selection reference voltage.

13. The power supply of claim 12, wherein the charge pump is configured to generate the second voltage before the switching pulse has increased to a first pulse width threshold.

14. The power supply of claim 12, wherein the internal power supply and the charge pump do not include a Schottky diode.

15. The power supply of claim 12, wherein the pulse generator is configured to generate the switching pulse by comparing a saw pulse with a saw pulse comparison signal, the saw pulse having a slope based on a pulse width modulation signal, the saw pulse comparison signal based on the target signal.

16. The power supply of claim 12, wherein the current controller comprises:
a first sampling circuit configured to divide the first voltage in response to a first enable signal and output the target signal based on the division;
a reference voltage generator configured to output the selection reference voltage in response to a reference voltage selection signal; and
a first comparator configured to compare the target signal with the selection reference voltage and output the modulation control signal.

17. The power supply of claim 16, wherein the internal power supply further includes a first voltage generator to generate a feedback signal; and wherein the pulse generator includes,
- a saw pulse generator configured to generate a saw pulse having a slope based on a pulse width modulation signal, the saw pulse based on the modulation control signal and a second enable signal;
- a saw pulse comparison signal generator configured to output the target signal or the feedback signal as a saw pulse comparison signal in response to the second enable signal; and
- a second comparator configured to compare the saw pulse with the saw pulse comparison signal and generate a switching pulse.

* * * * *